US008327441B2

(12) United States Patent
Kumar et al.

(10) Patent No.: US 8,327,441 B2
(45) Date of Patent: Dec. 4, 2012

(54) SYSTEM AND METHOD FOR APPLICATION ATTESTATION

(75) Inventors: Srinivas Kumar, Cupertino, CA (US); Gurudatt Shashikumar, Foster City, CA (US)

(73) Assignee: Taasera, Inc., Erie, PA (US)

( * ) Notice: Subject to any disclaimer, the term of this patent is extended or adjusted under 35 U.S.C. 154(b) by 0 days.

(21) Appl. No.: 13/399,065

(22) Filed: Feb. 17, 2012

(65) Prior Publication Data

US 2012/0216244 A1    Aug. 23, 2012

Related U.S. Application Data

(60) Provisional application No. 61/443,854, filed on Feb. 17, 2011.

(51) Int. Cl.
*H04L 29/06* (2006.01)

(52) U.S. Cl. ......................................................... 726/22

(58) Field of Classification Search .................. 726/22, 726/23, 24, 25

See application file for complete search history.

(56) References Cited

U.S. PATENT DOCUMENTS

| 6,091,835 | A | * | 7/2000 | Smithies et al. | 382/115 |
|---|---|---|---|---|---|
| 6,507,904 | B1 | * | 1/2003 | Ellison et al. | 712/229 |
| 6,760,441 | B1 | * | 7/2004 | Ellison et al. | 380/45 |
| 6,990,579 | B1 | * | 1/2006 | Herbert et al. | 713/164 |
| 6,996,710 | B1 | * | 2/2006 | Ellison et al. | 713/156 |
| 7,013,481 | B1 | * | 3/2006 | Ellison et al. | 726/4 |
| 7,194,759 | B1 | * | 3/2007 | Chess et al. | 726/2 |
| 7,587,607 | B2 | * | 9/2009 | Brickell et al. | 713/182 |
| 7,797,544 | B2 | * | 9/2010 | Dillaway et al. | 713/179 |
| 7,882,221 | B2 | * | 2/2011 | Sailer et al. | 709/224 |
| 7,979,696 | B2 | * | 7/2011 | Kim et al. | 713/156 |
| 7,984,304 | B1 | * | 7/2011 | Waldspurger et al. | 713/187 |
| 8,108,536 | B1 | * | 1/2012 | Hernacki et al. | 709/231 |
| 2005/0033987 | A1 | * | 2/2005 | Yan et al. | 713/201 |
| 2005/0132031 | A1 | * | 6/2005 | Sailer et al. | 709/223 |
| 2005/0132202 | A1 | * | 6/2005 | Dillaway et al. | 713/179 |
| 2005/0138384 | A1 | * | 6/2005 | Brickell et al. | 713/182 |
| 2005/0221766 | A1 | * | 10/2005 | Brizek et al. | 455/73 |
| 2005/0283660 | A1 | * | 12/2005 | McKeen et al. | 714/11 |
| 2005/0289072 | A1 | | 12/2005 | Sabharwal | |

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Aug. 27, 2012, issued in corresponding International Application No. PCT/US2012/025551. (9 pages).

*Primary Examiner* — David Garcia Cervetti

(74) *Attorney, Agent, or Firm* — Buchanan Ingersoll & Rooney PC

(57) ABSTRACT

An instrumented machine or platform having a target application thereon is disclosed. An attestation service may generate an application artifact having associated therewith a name and an application statement having at least one of a plurality of attribute value assertions describing the examined runtime local execution and introspection based derived security context. The application statements may represent the level of contextual trustworthiness, at near real time, of a running application on the instrumented target platform. A runtime process and network monitor may examine the local runtime execution context of the target application, and an identity provider may authenticate a user to the web application based on a web services query for attestation of the target application. A physical or logical authorization service may control access of an authenticated user to the target application, based on a dynamic application statement and multi-factor application attestation issued by the attestation service.

26 Claims, 11 Drawing Sheets

U.S. PATENT DOCUMENTS

| | | | |
|---|---|---|---|
| 2006/0005009 A1* | 1/2006 | Ball et al. | 713/155 |
| 2006/0200680 A1* | 9/2006 | Ellison et al. | 713/190 |
| 2007/0005992 A1* | 1/2007 | Schluessler et al. | 713/193 |
| 2007/0143474 A1 | 6/2007 | Sheng et al. | |
| 2007/0174406 A1 | 7/2007 | Morris et al. | |
| 2007/0185856 A1* | 8/2007 | Mittal et al. | 707/5 |
| 2008/0015808 A1* | 1/2008 | Wilson et al. | 702/123 |
| 2008/0083039 A1* | 4/2008 | Choi et al. | 726/27 |
| 2008/0141027 A1* | 6/2008 | Kim et al. | 713/156 |
| 2008/0235372 A1* | 9/2008 | Sailer et al. | 709/224 |
| 2008/0289028 A1* | 11/2008 | Jansen et al. | 726/11 |
| 2009/0094584 A1 | 4/2009 | Dheap et al. | |
| 2009/0133110 A1 | 5/2009 | Kumar et al. | |
| 2009/0138939 A1 | 5/2009 | Kumar et al. | |
| 2009/0144818 A1 | 6/2009 | Kumar et al. | |
| 2009/0172814 A1* | 7/2009 | Khosravi et al. | 726/23 |
| 2009/0178138 A1* | 7/2009 | Weiss et al. | 726/22 |
| 2009/0204806 A1* | 8/2009 | Kanemura et al. | 713/155 |
| 2009/0204964 A1* | 8/2009 | Foley et al. | 718/1 |
| 2009/0241170 A1 | 9/2009 | Kumar et al. | |
| 2009/0276204 A1 | 11/2009 | Kumar et al. | |
| 2009/0328186 A1 | 12/2009 | Pollutro et al. | |
| 2010/0281273 A1* | 11/2010 | Lee et al. | 713/190 |
| 2011/0035577 A1* | 2/2011 | Lin et al. | 713/150 |
| 2011/0154500 A1* | 6/2011 | Sahita et al. | 726/26 |
| 2011/0173643 A1* | 7/2011 | Nicolson et al. | 719/328 |
| 2011/0179477 A1* | 7/2011 | Starnes et al. | 726/9 |
| 2012/0084850 A1* | 4/2012 | Novak et al. | 726/8 |
| 2012/0131334 A1* | 5/2012 | Haikney et al. | 713/156 |

* cited by examiner

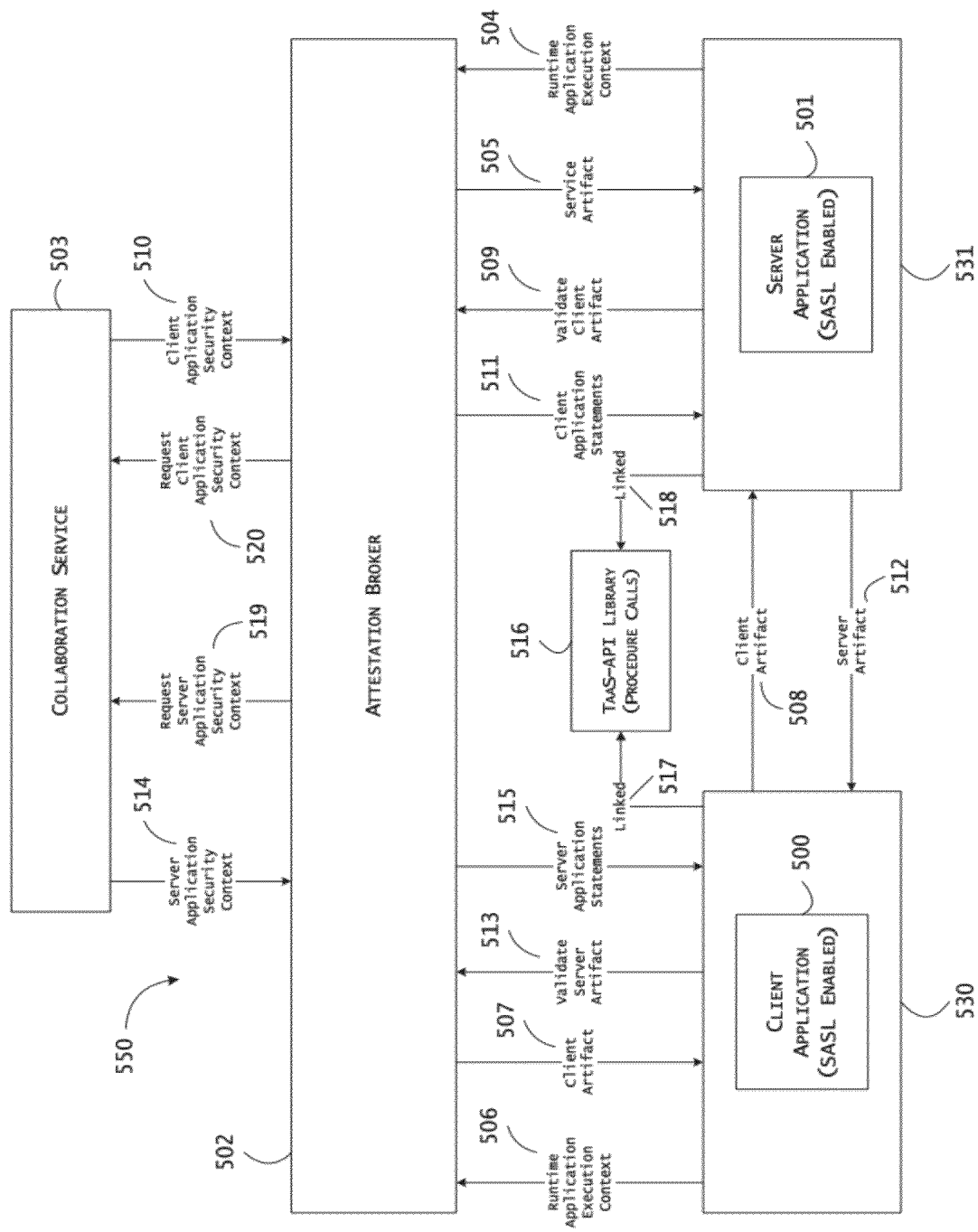

FIG. 6

TaaS Integrity Dashboard (600)

| Service Host (604) | Service Realm (603) | Service Name (602) | Version (606) | Vendor (605) | Metrics (608) | Ports (607) |
|---|---|---|---|---|---|---|
| ENG0003 | eng.dba.com | SharePoint Server | 2010 | Microsoft Corporation | V/C/R/P | 443 |
| DEV0004 | dev.eng.dba.com | Apache HTTP Server | 2.2 | GNU GPL | V/C/R/P | 443 |
| QA0005 | qa.dba.com | FileZilla Server | 0.9.37 | GNU GPL | V/C/R/P | 21 |
| QA0007 | qa.dba.com | Telnet Server | 7.0 | Microsoft Corporation | V/C/R/P | 23 |
| FD0008 | finance.dba.com | OpenSSH Server | 5.1 | GNU GPL | V/C/R/P | 22 |
| FD0009 | finance.dba.com | IIS Server | 3.0 | Microsoft Corporation | V/C/R/P | 119; 443 |
| TS0010 | tech-support.dba.com | Tomcat Server | 6.0.29 | GNU GPL | V/C/R/P | 443 |
| TS0011 | tech-support.dba.com | WebSphere application Server | 7.0 | IBM | V/C/R/P | 443 |
| ELAB0012 | lab.qa.dba.com | NetWeaver | 7.3 | SAP | V/C/R/P | 443 |
| ELAB0013 | lab.qa.dba.com | WebLogic | 10.3.1 | Oracle | V/C/R/P | 443 |
| PS0014 | proserv.dba.com | Microsoft Exchange Server | 5.5 | Microsoft Corporation | V/C/R/P | 379; 443; 445; 993; 995 |
| PM0015 | proserv.dba.com | Active Directory | 2,008.0 | Microsoft Corporation | V/C/R/P | 389; 636 |
| BD0016 | bizdev.dba.com | Zimbra | 10.3.1 | VMware, Inc. | V/C/R/P | 25; 110; 143; 443 |

Monitor Date/Time: January 26, 2010 9:18 AM (PST) (601)

650

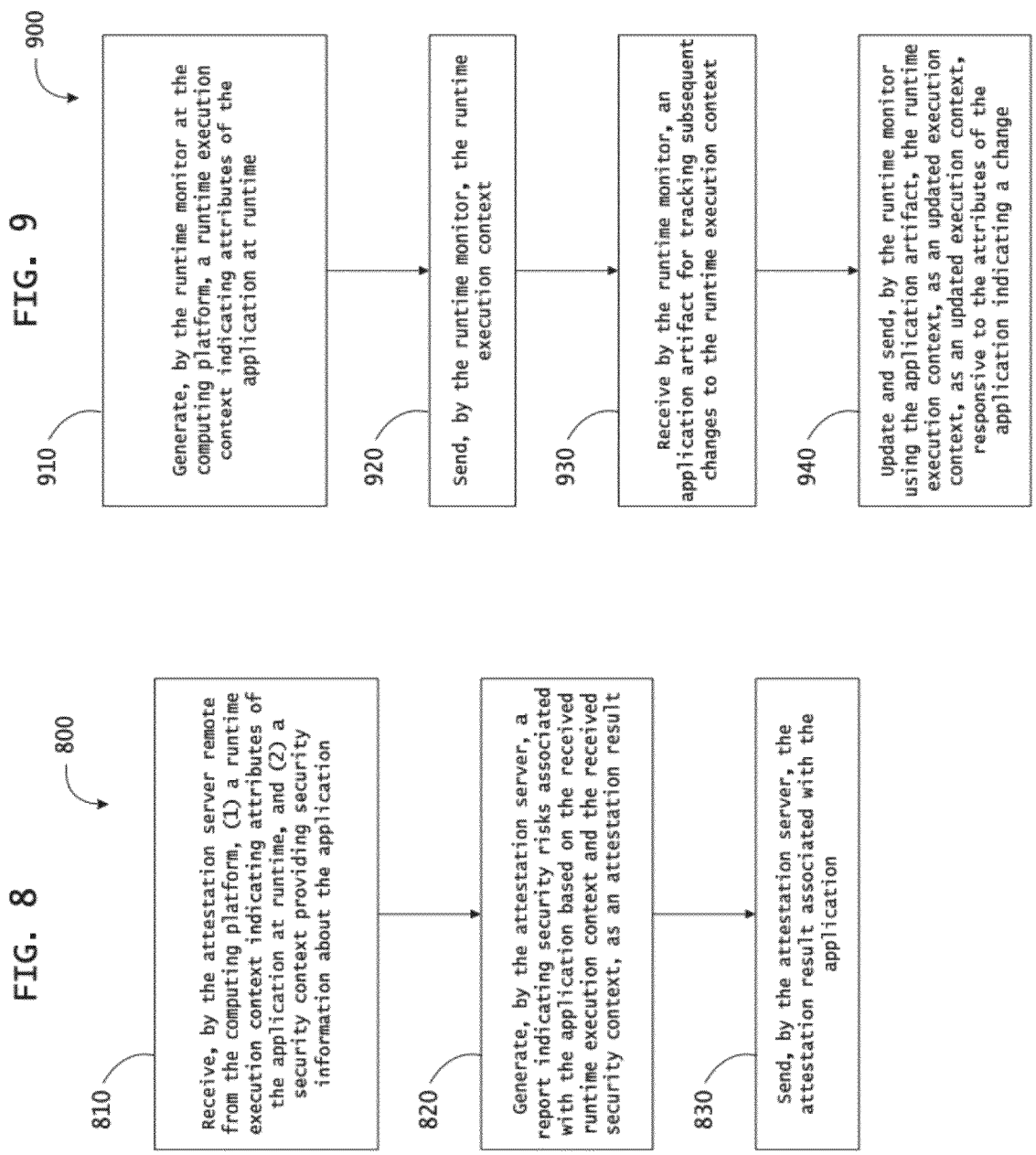

SYSTEM AND METHOD FOR APPLICATION ATTESTATION

CROSS-REFERENCE TO RELATED APPLICATIONS

The present application claims the benefit of U.S. Provisional Appl. No. 61/443,854 entitled "SYSTEM AND METHOD FOR APPLICATION ATTESTATION," filed Feb. 17, 2011, which is incorporated by reference herein in its entirety.

BACKGROUND OF THE DISCLOSURE

1. Field of the Disclosure

The present disclosure relates to the field of data center virtualization and, more particularly, to a system and method to provide attestation of applications at runtime.

2. Description of the Related Art

One recent trend in computing is the trend towards cloud computing in which, for example, enterprise software is no longer owned by the customer, but instead the Information Technology infrastructure can be provided by a third party and the software applications may be sold as service offerings.

SUMMARY OF THE DISCLOSURE

The presently disclosed technology may be embodied as a method, apparatus and/or system to discover one or more applications and/or to attest for the applications on an instrumented target platform at runtime using or based on a plurality of assertions (or statements).

The presently disclosed technology also may be embodied as a method, apparatus, and/or system for a plurality of services that enable visibility, control, and/or compliance in a cloud computing environment with dynamic application discovery, identification, monitoring and/or attestation based on a plurality of factors.

The presently disclosed technology also may be embodied as a further method, apparatus and/or system to establish user-to-application connections based on dynamic attestation of applications, and/or security controls provisioned based on context-aware business logic instead of, for example, topology based coordinates associated with encapsulation headers in network packets.

The presently disclosed technology also may be embodied as a yet further method, apparatus and/or system to authorize user-to-application transactions and/or data exchange in an established connection, during the authentication phase based on dynamic attestation of applications.

The presently disclosed technology also may be embodied as an additional method, apparatus and/or system for a runtime monitor to inspect web and non-web applications (e.g., all web and non-web applications) running on the instrumented target platform. The system may include an attestation service (or broker) using an attestation server and configured to generate application artifacts and/or to issue application statements or claims. The application artifact may represent an identified application instance (e.g., at runtime, globally unique, opaquely and/or in a time-sensitive manner, for example, using an application artifact having a specified or predetermined lifetime) on an instrumented platform (such as but not limited to, a Personal Digital Assistant (PDA), a tablet computing device, an iPhone™, an iPod™, an iPad™, a device operating the Android operating system (OS) from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, a gaming console, or another similar type of computing device having a computer, microprocessor). The application statements may include at least one statement (or claim) about an inspected runtime execution context and/or an intelligence based security context.

The runtime monitor may be configured to inspect the execution context of the application after using a local attestation process. The execution context of each respective application may include associated files, processes, and/or network epochs (e.g., socket events). The system may include any type of identity provider configured to authenticate a user to web or non-web applications (for example, client-server or peer-to-peer applications) based on a request for attestation of and a security context of a target application on a computing platform (e.g., the instrumented target platform).

The presently disclosed technology also may be embodied as a method, apparatus and/or system that may include a network access enforcer for controlling the authenticated user's physical access to the target application on the instrumented target platform, responsive to one or more issued application statements (e.g., issued by the attestation service or another entity).

The presently disclosed technology also may be embodied as another method, apparatus and/or system to include an identity provider for controlling the authenticated user's authorization to commence transactions with a target application on the instrumented target platform, responsive to one or more issued application statements (e.g., issued by the attestation service).

The presently disclosed technology also may be embodied with an application artifact that may include at least a registered name (e.g., a registered globally unique security principal name) for the running application instance (e.g., a user program or a service program, among others). The attestation service may be configured to generate an artifact based on a runtime local execution context of the running application instance on the instrumented target platform.

The presently disclosed technology also may be embodied with one or more application statements or claims which may include at least one of: (1) a registered name (e.g., a registered globally unique security principal name) for the running application instance; (2) a digitally signed certificate; (3) creation and/or modification timestamps; (4) assertions of a security context from a plurality of collaboration services; (5) a list of active listening and/or open network ports (e.g., well-known and/or ephemeral); (6) network addresses used by the application; (7) a product publisher; (8) a product version; and/or (9) other runtime local execution context information.

The presently disclosed technology also may be embodied with one or more application statements or claims, which may include attribute value assertions about an introspected security context of one or more running applications. The introspected security context may be received from one (e.g., any one) of the plurality of collaboration services.

The presently disclosed technology may also be embodied with a plurality of collaboration services which may include: (1) an application whitelisting services (e.g., any application whitelisting services); (2) a vulnerability assessment service; (3) a patch management service; (4) an anti-virus service (5) a predictive and behavioral analytics engine; (6) and orchestration service; (7) a network intrusion detection or prevention service; (8) an open flow switch controller; and/or (9) a malware analysis system.

The presently disclosed technology may also be embodied with: (1) an identity provider that may include a single sign-on service or a brokered authentication service; (2) a network access enforcer, which may include devices such as for example network firewalls, load balancers, and/or VPN gateways, and which may be configured as a policy enforcement point to control access based on an application statement or claim.

The presently disclosed technology also may be embodied as a method, apparatus and/or system for evaluating authenticity of a web application (for example, a servlet in a container element). The method may include requesting a runtime application artifact for the web application from an attestation service, and requesting, based on the application artifact, an application statement from the attestation service. The method may further include requesting from a plurality of collaboration services, for example by the attestation service, a context (e.g., an introspection based security context) for the web application on the instrumented target platform. The method may also include establishing a communication channel (e.g., a secure communications channel) between the instrumented target platform and the server providing attestation service, and generating an application statement corresponding to at least one component of the web application. The method may include generating the statement about the application components, based on a parent/child association and/or a loader dependency, and transmitting the application statement to an identity provider. The method may further include generating a multi-factor confidence metric of the web application to be included with and rendered natively by a passive web client or browser.

The presently disclosed technology may be embodied as another method, apparatus and/or system for evaluating authenticity of a non-web client-server application and/or a peer-to-peer application. The method may include requesting an application artifact for the application from an attestation service, for example, by a runtime monitor, and requesting an application statement from the attestation service, for example, by network access enforcer(s). The method may further include requesting, by the attestation service from a plurality of collaboration services, a context (e.g., an introspection based security context) for the application on the instrumented target platform. The method may also include requesting a notification of or subscribing to a change (e.g., any change) in the execution context of the application on the instrumented target platform. The method may additionally include generating and publishing one or more application statements or claims about (regarding) the application based on at least one of a subscription request by a plurality of identity providers and/or network access enforcers. The method may further include receiving or generating, and publishing a multi-factor confidence metric of the application for a physical or logical access control decision.

The presently disclosed technology also may be embodied as a method, apparatus and/or system for client-server and/or peer-to-peer applications to evaluate the authenticity of peers prior to commencing a transaction or data exchange (e.g., any transaction or data exchange). The method may include a client-server application and/or a peer-to-peer application that may request an application artifact for each of the applications from an attestation service (or attestation server), and further may request, based on an artifact exchange, one or more application statements from the attestation service for each peer application. The method may further include requesting, by the attestation service from a plurality of collaboration services, a context (e.g., an introspection based security context) for these applications on the instrumented target platforms. The method may further include a secure exchange of the issued application artifacts between the applications, and a verification process (such as a back-channel verification of the exchanged artifacts with the attestation service). This method may further include requesting one or more application statements, based on (or responsive to) the exchanged application artifact, from the attestation service, and determining by the peer applications, or by the network access enforcer(s) receiving the one or more application statements, responsive to receiving the application statements, the authenticity of the other, or each application in the transaction.

The presently disclosed technology also may be embodied as a method, apparatus and/or system for displaying and continuously updating in real time or near real time (e.g., within a threshold period) the identity, attribution, and/or attestation information of executing or running (e.g., all running) applications hosted in the private an/or public virtual data centers in a cloud computing infrastructure. The method may include displaying one or more classification based confidence metrics and active listening and/or open network ports (e.g., well known and ephemeral) assigned on a plurality of instrumented target platforms.

The presently disclosed technology also may be embodied as a method, apparatus and/or system for establishing access control policies based on a user authentication method, a user role, a dynamically discovered and attested application running on an instrumented target platform via subscription based application statements from an attestation service. The method may also include decoupling of the business logic (role based access controls, authentication requirements, and/or line of business applications, among others) from the network topology based physical constraints in the network fabric (e.g. IP addresses, MAC addresses, VLAN identifiers, and/or subnet addresses, among others) and may include context-aware logical attributes (user identity and/or application identity among others) in policy grammar. The method may further include establishing access control rules that may leverage classification based dynamic confidence metrics, which may be included in an application statement used for authorization decisions.

BRIEF DESCRIPTION OF THE DRAWING FIGURES

The invention is best understood from the following detailed description when read in connection with the accompanying drawings. According to common practice, various features/elements of the drawings may not be drawn to scale. Common numerical references represent like features/elements. The following figures are included in the drawings:

FIG. 5 is a schematic diagram illustrating a method of monitoring and attesting a Simple Authentication and Security Layer (SASL) enabled client and server application in accordance with various exemplary embodiments;

FIG. 6 is a schematic diagram illustrating an exemplary security administration console including an integrity dashboard in accordance with various exemplary embodiments;

FIG. 8 is a flowchart illustrating a method in accordance with various exemplary embodiments of the presently disclosed technology;

FIG. 9 is a flowchart illustrating a method in accordance with various exemplary embodiments of the presently disclosed technology;

DETAILED DESCRIPTION

Figure 1:
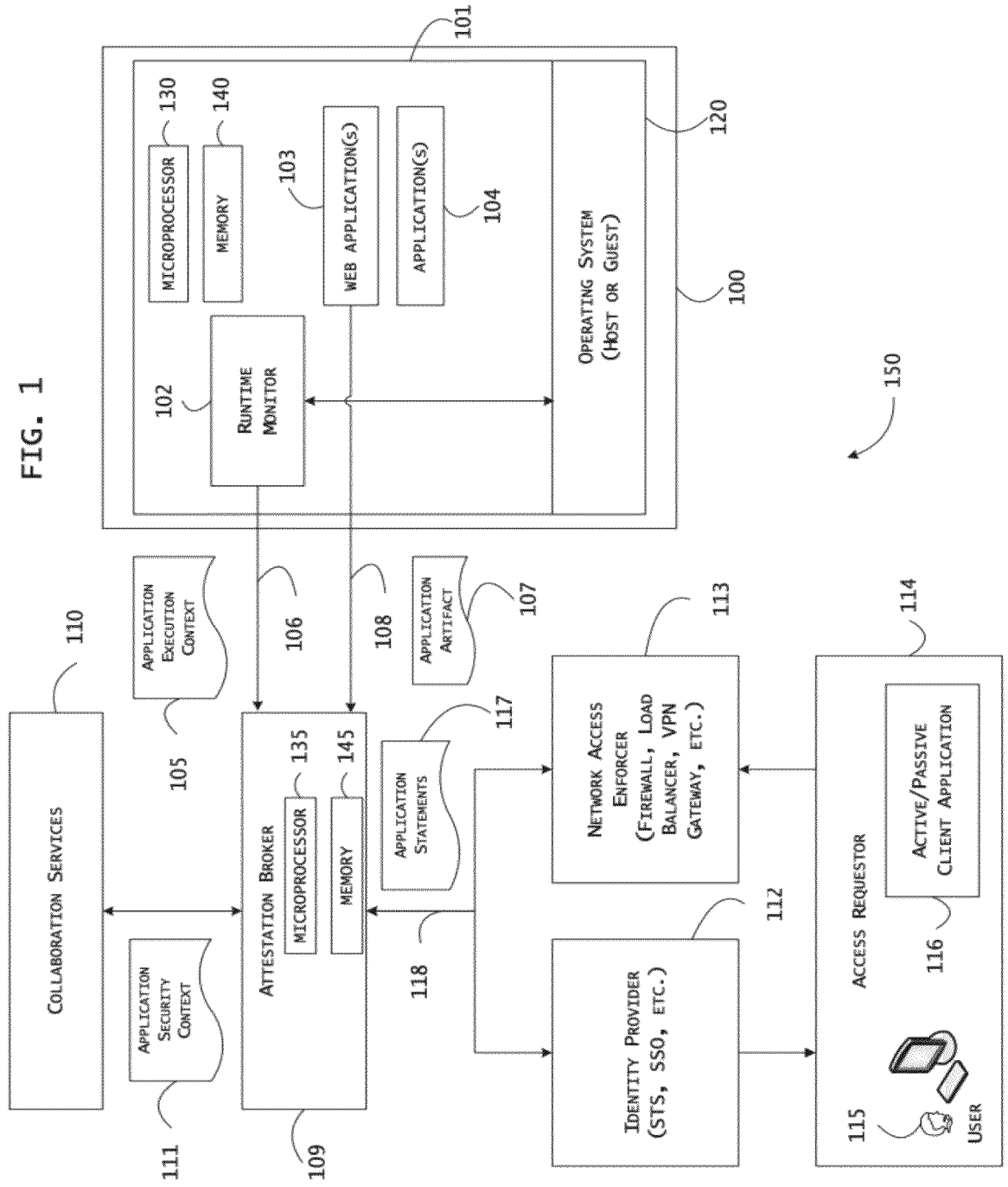
FIG. 1 is a schematic diagram illustrating an exemplary system/architecture in accordance with various exemplary embodiments.

Although the invention is illustrated and described herein with reference to specific embodiments, the invention is not intended to be limited to the details shown. Rather, various modifications may be made in the details within the scope and range of equivalents of the claims and without departing from the invention.

Many enterprises are moving there IT infrastructures to cloud computing environments (e.g., in which third parties may provide shared computing resources and applications running on those resources are offered as services to a plurality of customers) for various reasons including: (1) increased computing power; (2) increased storage capacity; and/or (3) increased network bandwidth, among others. Enterprise applications and mission critical applications may be executed in the cloud. Without adequate system and application security, the cloud can compromise these applications causing large financial losses. Data confidentiality, data integrity and data availability can be maintained in the cloud computing environment even when such applications may be controlled by these third parties. For example, enterprises are moving from self-managed on-premise data centers to service-provider managed outsourced virtual data centers (e.g., the cloud computing environments). The cloud may enable traditional information technology systems and applications to transparently execute from these service-providers managed outsourced virtual data centers. As newer technologies emerge, the cloud infrastructure may evolve transparent to and scalable with enterprise operations. Security in such environments may be an emerging challenge.

In certain exemplary embodiments, applications may be secured by signing-on or authenticating applications onto the network using an attestation process (e.g., via a single factor or multi-factor attestation). In a multi-factor process, applications may be qualified based on at least two factors. A first factor may identify one or more attributes of the application (e.g., run time instance of the application) such as (1) a hash of the application, as an application fingerprint, (2) other applications/processes called by the application, (3) ports used by the application, (4) computing, storage, and network resource usage by the application, and/or (5) the platform executing the application, among others. Such information may be available locally (e.g., at the computing platform running the application) in the current execution context. A second factor may identify what is known about the application based on the attributes of the application from security intelligence external to the operating environment (e.g., a third party (e.g., trusted third party) separate from the computing platform running the application).

Applications that are hosted in self-managed and in-house enterprise data centers may be gradually migrating to outsourced service provider managed virtual data centers in private/public clouds. There may be a loss of visibility and direct control from this migration. Various exemplary embodiments include instrumentation to monitor the applications in process to increase visibility and enable attestation of applications executing in the outsourced service provider managed virtual data centers. As web and multi-tier applications proliferate in the cloud, secure connectivity, based on certificates issued by third party certificate authorities may be inadequate for security and compliance because a significant number of web-based threats originate from trusted web sites.

Generally, access control mechanisms are based on static context and physical constraints rather than logical attributes and dynamic local execution context and/or a holistic security context (e.g., based on both local execution context as well as security intelligence). Physical and logical access controls based on user-to-application bindings, as an operative element of business logic, and logical attributes in a virtualized and fluid network may be used in a cloud computing environment (for the utility based infrastructure, platform and/or software as a service model) to scale and/or be viable for multi-tenancy or shared resources with deterministic confidentiality between or among tenants.

The access control mechanism may include an instrumented target (hosting) computing platform, a policy statement (e.g., grammar) based on a runtime base of the particular application, a temporal and environmental context independent of physical constraints or enforcement methods, an attestation broker (service or server) for notifying interactive users, network access enforcers and identity providers.

The confluence of single-sign-on (SSO) mechanisms and multi-tier applications (for example, the web, application, database tiers) may introduce higher risks of non-compliance in outsourced multi-tenant cloud services infrastructures. In the absence of reliable application attestation methods, impersonation and delegation of user's credentials may pose serious security threats in, for example, multi-hop transitive chain of services, for both intra-cloud and inter-cloud computing environments, where inter-service transactions may be based on implied trust.

FIG. 1 is a schematic diagram illustrating an exemplary network 150 in accordance with various exemplary embodiments.

Referring to FIG. 1, the exemplary network 150 may include a runtime monitor 102 that may discover and identify a web-based application 103 or non-web-based application 104 that may be executing or running on a computing platform (or an instrumented target platform) 100, an attestation broker 109 that may receive a request to attest to the identify of a running application and that may query one or more collaboration services 110 to request a context (e.g., a security context and/or an introspection based security context) of the running application. The application may be an application targeted for use by an access requestor 114 (e.g., another computing platform) that may be operated by a user (or end-user) 115 via, for example an active or passive client application 116, that may desire an assurance or an attestation that the application is appropriate to be used.

The attestation broker 109 (or the collaboration service 110) may be configured to generate application statements or reports 117, which may include assertions about the running target application, and may deliver the statements or reports 117 to the requestor, the third party, and/or end-user. The platform 100 may include any computing device 101 and/or virtual platform, for example, (e.g., a computer, microprocessor, Personal Digital Assistant (PDA), smartphone, notebook computer, and/or a virtual server running on hardware, among others). The computing device may include a microprocessor 130 for execution, for example, of computing platform software such as operating system software, applications, and runtime monitor software, among others and a memory 140 for data, metadata, and software storage.

The attestation broker 109 may issue application artifacts 107 (e.g., that may maintain a record of the state of the discovered or identified applications running on the instrumented platform 100) to the runtime monitor 102 for discovered or identified applications running on the instrumented platform 100. The runtime monitor 102 may use the application artifacts 107 to generate attribute value assertions (e.g., assertions regarding one or more attribute values associated with each respective running application) to describe the application execution context 105 of the applications.

For example, the attestation service or apparatus may include a processing unit 135 for: (1) receiving remote from the computing platform 101, a runtime execution context 105 indicating attributes of the application at runtime, and a security context 111 providing security information about the application; (2) generating a report 117 indicating security risks associated with the application based on the received runtime execution context 105 and the received security context 111, as an attestation result; and/or (3) sending the attestation result associated with the application; and a memory 145 for storing the generated report.

As a second example, the runtime monitor or monitoring apparatus may include: a processing unit 130 (e.g., a processor shared with the computing platform 101 or a separate processor) for: (1) generating a runtime execution context 105 indicating attributes of the application at runtime; (2) sending the runtime execution context 105 to the attestation service or server 109; (3) receiving an application artifact 107 for tracking subsequent changes to the runtime execution context 105; and/or (5) updating and sending using the application artifact 107, the runtime execution context 105, as an updated execution context, responsive to the attributes of the application indicating a change; and a memory 140 for storing the application artifact 107.

The application artifact may include previous assertions or may provide an identifier that associates the application to the previous assertions. The application execution context 105 may include at least a base (or static), temporal (or dynamic) and/or environmental aspects or attributes of the target application. A requestor (for example, a network access enforcer 113, such as a network firewall, a load balancer, a VPN gateway, and/or an identity provider 112, such as an Security Token Service (STS), Single Sign On (SSO) solution may subscribe for application statements or reports 117 from the attestation broker 109.

In certain exemplary embodiments, the generation of attribute value assertions for the application execution context 105 by the runtime monitor 102 on the instrumented platform 100 may include, for example, the collection of file hash digests and/or file attributes (e.g., file size, publisher details, creation and/or modification timestamps, digital signings, and product versions) for loaded (e.g., all loaded and/or in process) components of the running target application 103 or 104. The application execution context 105 may include parent-child process associations and/or loader dependencies, information about active listening and/or open network ports that are well known or ephemeral. The application execution context 105 may also include the executable file binaries. The runtime monitor 102 may generate and report the collection in a digitally-signed report to the attestation broker 109 in an application execution context notification.

In certain exemplary embodiments, as an outcome of (or based on) the evaluation of the running target application 103 or 104 on the target instrumented platform 100 using collaboration services 110, the attestation broker 109 may issue application statements or reports 117 via application statement notification 118. The issued application statements or reports 117 may be digitally-signed, and may include a name of the application instance (e.g., a globally unique security principal name of the application instance or other application identifier), as its application identifier. The application instance may be a user program or a service program. One example of such a name may be "service/hostname@realm".

The application statements or reports 117 may include attribute value assertions that may describe the runtime execution context 105 and application security context 111 of the application instance on the instrumented platform 100, as a machine identifier. The application identifier may be a publisher designated product name or a registered service principle name in a services directory. The machine identifier may be an IPv4/IPv6 address, a directory network services (DNS) hostname, a MAC address, a serial number (e.g., an IT or manufacturer issued serial number), an RFID, and/or other device identifiers, among others. The attestation broker 109 may provide to the requestor 112, 113 or 114, a confidence metric that may include one or more ratings (e.g., application confidence ratings for the targeted application).

The confidence metric may, for example, be classified based on: (1) the vulnerability of the application, (2) compliance of the application, (3) referential integrity of the application, and/or (4) patch level of the target application. These ratings may be determined by the attestation broker 109 based on communications or interactions with one or more of the plurality of collaboration services 110. The confidence metrics may include a value for each classification and/or an overall value, which is weighed by classification or averaged. The weighing may be predetermined, preset or determined based on user input. The confidence metrics may be a numerical representation of the evaluation of one or more of the collaborative services 110.

In certain exemplary embodiments, the application statements or reports 117 may be used by passive clients 116 (for example, a web browser) to render an icon or other indicator (either visual on the web page or audio indicator, for example, an icon at the bottom of the web page). The indicator may be an indicator (or an attestation) of the web application's authenticity to the user 115. For example, the user 115 may click on the attestation icon to view web application specific information issued by the attestation broker 109 for the accessed web application. The attestation broker 109 may be a third party independent and trusted entity that provides such attestation services. The user 115 may confirm that the application attestation offered by the attestation broker 109 is current (e.g., that the lifetime of the application attestation has not expired).

The user 115 or access requestor 114 (e.g., the computing platform of the user) may ascertain from the attestation broker 109 that the application statements or reports (or claims 117 represent a recently (e.g., a most recent) verified contextual assessment of the accessed web application based on timestamps and/or message sequencing in the application statements 117. The determination that the claims represent the most recent verified contextual assessment may be based on consolidating information collected via one or more of a plurality of collaboration services 110.

The application statements or reports 117 may be received and may be interpreted by one or more network access enforcers 113 (e.g., network firewalls, load balancers, and/or VPN gateways, among others), one or more identity providers 112 (e.g., STS, and/or SSO services, among others) and/or active clients 116 (e.g., Simple Authentication and Security Layer (SASL) enabled client-server and/or peer-to-peer applications, among others) to leverage contextual information about the target application 103 or 104 on the instrumented platform 100.

The runtime monitor 102 may discover, may identify and may track process starts (e.g., all process starts), process terminations (e.g., all process terminations) and network epochs (e.g., socket events) of applications on the operating system 120 of the instrumented platform 100. The local execution context of the running application may be determined at runtime and may be reported as attribute value assertions over a communication channel 106 to the attestation broker service 109.

In certain exemplary embodiment, the communication channel 106 may be a secure communication channel and/or the communication may be secured via known encryption/decryption methods. The attestation broker 109 may request introspection based security context (for example, evaluations and behavioral or predictive analytics based on historic state information and measurements sampled over a period of time using a variety of inspection methods) for the running application on the instrumented platform 100 from one or more of the plurality of collaboration services 110.

In certain exemplary embodiments, the collaboration services 110 may perform just-in-time inspection (e.g., an assessment scan) of the target application and platform 100. The collaboration service 110 may lookup the most recent inspection report based on, for example, an IT service management schedule and may return the requested attestations pertaining to the application execution context 105 to the requestor 112, 113 or 114 or the user 115.

The attestation broker 109 may generate and may return an application artifact 107 for the running application 103 or 104 to the runtime monitor 102, as a reference for subsequent execution context change notifications 207 (see FIG. 2) for the applications. Changes (e.g., any changes) in the running application's local execution context 105 may trigger an interaction with the attestation broker 109 (e.g., a communication by the runtime monitor 102 to the attestation broker 109) to reissue the application statements or reports 117 for attestation of the targeted application having the changed local execution context. For example, when the hash of the targeted application changes or the file size of the targeted application changes, an updated attestation may be initiated by the runtime monitor 102 and provided by the attestation broker 109. The attestation broker 109 may query one or more of the collaborative services 110 to determine the updated application statement or report 118 associated with the changed targeted application.

In certain exemplary embodiments, the attestation broker 109 may provide a single confidence value that represents the confidence (or risk) regarding the authenticity of the targeted application or a confidence metrics of a plurality of values based on different (e.g., independent) classifications. In other exemplary embodiments, the attestation broker 109 may provide the confidence metrics and other information in a standard format such that the requestors 112, 113 and/or 114 or the runtime monitor 102 may analyze various attributes of the other information. For example, the runtime monitor 102 may store or may have access to application attestation policies and may compare the local execution context and application statement or report 117 with the attestation policies to determine whether the targeted application is authenticated for use by the requestor. The identity provider 112 may receive, for example, a web redirect from web application 103 to perform brokered authentication ceremonies to login a user (e.g., an interactive user) 115.

In certain exemplary embodiments, the web application 103 may request via an application artifact request 106 an application artifact 107 from the attestation broker 109. The web application 103 may include the received application artifact 107 in a web redirect to the identity provider 112. The identity provider 112 may perform a back-channel query 118 to validate that the received application artifact 107 had been issued by the attestation broker 109 to ascertain the authenticity of the web application 103. The identity provider 112 may then receive application statements or reports 117 for the web application 103. A visual, audio or programmatic indication of application attestation may be provided to the access requestor 114 or user 115 via the access requestor 114.

The interactive user 115 or requestor 114 may receive a visual or audio attestation of application authenticity, for example, in the form of a visual indicator or an icon on the login form. The attestation may be accepted or rejected before proceeding with any transaction with the web application 103 or the attestation may be automatically accepted after a predetermined or user specified time period, if not rejected by the user 115 or requestor 114.

A network access enforcer 113 may subscribe with the attestation broker 109 for application statements or reports 117 and may discover a plurality of target applications 103 or 104 on a plurality of target machines or platforms 100. The communication protocol for the communications 118 between the attestation broker 109 and the network access enforcer 113 may be any standards based protocol and message exchange data structures or schemas, such as for example: (1) Simple Object Access Protocol (SOAP); (2) Representational State Transfer (REST); or (3) Trusted Computing Group's (TCG's) Interface for Metadata Access Points (IF-MAP) specification, among others.

The attestation broker 109 may publish notifications with real time or near real-time application statements or reports 117 for the network access enforcer 113 to apply physical access controls (e.g., controls to physically enable access to or to block access to the targeted application). The determination to enable or disable physical access by the network access enforcer 113 may be based on attribute value assertions (e.g., in the transport layer) in application statements or records 117. The attribute value assertions may include for example, static (e.g., well known) and/or dynamic (e.g., ephemeral) network ports assigned to the target application 103 or 104.

An active client application 116 and/or a server application 104 (e.g., using the Simple Authentication and Security layer (SASL) protocol) may request and/or use the received application statements or reports 117 programmatically for a mutual attestation handshake. For example, using SASL protocol such a mutual attestation handshake may be defined by an integrity exchange profile, before initiating an authentication handshake with proof of possession of credentials.

Figure 2:
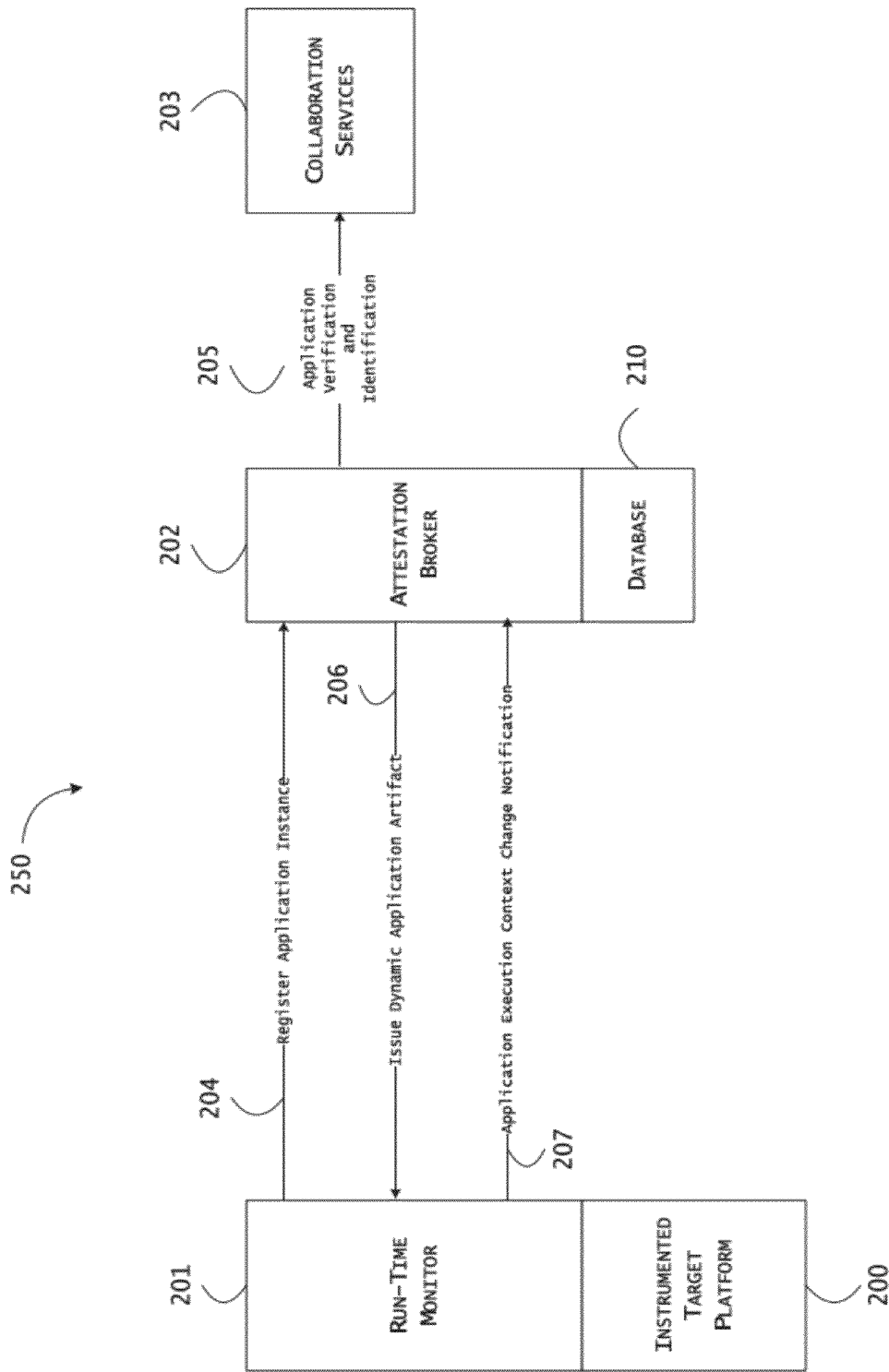
FIG. 2 is a schematic diagram illustrating a method of monitoring and attesting applications in a cloud computing environment in accordance with various exemplary embodiments.

FIG. 2 is a schematic diagram illustrating a method of monitoring and attesting applications in a cloud computing environment in accordance with various exemplary embodiments.

Referring to FIG. 2, an exemplary network 250 may include a runtime monitor 201, an instrumented target platform 200, an attestation broker 202, a metadata database 210, and/or a plurality of collaboration services 203.

The runtime monitor 201 may discover, may inspect, may identify and/or may attest to the runtime execution of applications on the instrumented target platform 200. The attestation broker 202 may issue application artifacts 206 based on a received application execution context (or application execution context change notification) 207 for registered application instances 204. Responsive to the request from the runtime monitor 201, or an access requestor 114 or user 115, the attestation broker (or attestation server) 202 may initiate a query 205 of one or more of the plurality of collaboration services (or collaboration servers) 203. The query 205 may include a search for a security context (e.g., an introspection based security context) for the target application.

In certain exemplary embodiments, the applications running on the instrumented target platform 200 may be verified using one or more of the collaboration services 203 for identification, based on an application execution context received from the runtime monitor 201 either directly or via the attestation broker 202.

The runtime monitor 201 may inspect the execution context of processes on the instrumented target platform 200 for application epochs (e.g., process and/or socket events). Responsive to or after detection of application process start, a runtime application execution context (e.g., metadata) may be generated. The metadata may include: (1) the file hash digest, (2) file attributes (for example, the file size, the publisher details, the creation and/or the modification timestamps, the digital signing, and/or the product version) for loaded components of the running target application, (3) parent-child process associations, (4) loader dependencies, and/or (5) information about active listening and/or open network ports that may be well-known and/or ephemeral; and/or executable file binaries. The running application may be registered 204 by providing the generated application execution context to the attestation broker 202.

In certain exemplary embodiments, the attestation broker 202 may verify the authenticity of the running application on the instrumented target platform 200 with the query 205. The query 205 that may include the metadata collected from the runtime monitor 201 may be sent from the attestation broker 202 and received by one or more collaboration services 203. The query 205 may request a security context for the running application that may indicate the level of risk (of confidence) associated with running the target application on the instrumented platform 200.

The attestation broker 202 may generate a dynamically changing application artifact 206 which may be time sensitive and may be globally unique. The application artifact 206 may be based on the received application execution context and the attestation broker 202 may return the generated application artifact to the runtime monitor 201. The runtime monitor 201 may inspect each of the running applications for state changes including, for example, active listening and open network ports (e.g., well-known and ephemeral) and/or terminations of the applications. These inspections may occur, for example, at the transport layer of the open systems interconnection (OSI) stack.

In certain exemplary embodiments, other types of state changes may be inspected, such as elements related to the execution context. Any contextual (state) changes may be notified in real time or near real time by an application execution context change notification 207 from the runtime monitor 201 to the attestation broker 202. The attestation broker 202 may store persistent and/or transient state information (e.g., including metadata) in a local database or remote repository 210, such as an IF-MAP Server, for example) for registered applications (e.g., each registered running application) on one or more of the plurality of instrumented target platforms 200.

Figure 3:
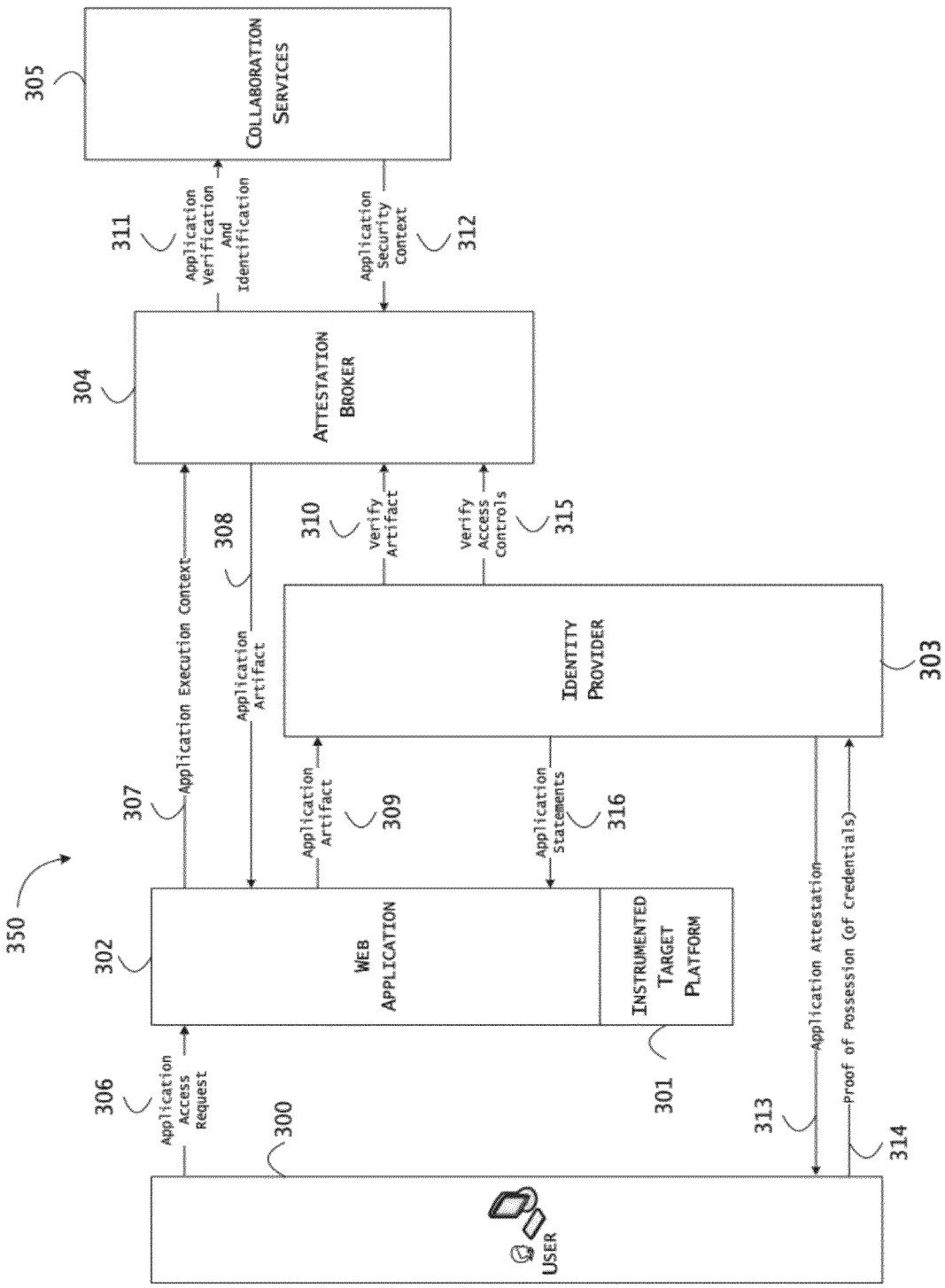
FIG. 3 is a schematic diagram illustrating another method of monitoring and attesting applications in the cloud computing environment in accordance with various exemplary embodiments.

FIG. 3 is a schematic diagram illustrating another method of monitoring and attesting applications in the cloud computing environment in accordance with various exemplary embodiments.

Referring to FIG. 3, an exemplary network 350 may include an interactive user 300, an instrumented target platform 301, a web application 302, an identity provider 303, an attestation broker 304 and collaboration services 305. The web application 302 may interact with the attestation broker 304 for runtime multi-factor attestation of the web application 302. The operational flow may enable a mechanism to apply, for example, at a post-connect phase of a session for authorization control on an intermediate node element in the control path.

The interactive user 300 may establish a physical connection over a network and may initiate an application access request 306 to commence or initiate a transaction with a web application 302 hosted on the instrumented target platform 301.

In certain exemplary embodiments, the web application 302 may execute a code element (such as for example, a web servlet or other processing element) that may generate a runtime application execution context (e.g., metadata) and may automatically initiate a query 307 to the attestation broker 304 by sending the generated metadata of the runtime application execution context.

In certain exemplary embodiments, the attestation broker 304, may verify the authenticity of the running web application 302 on the instrumented target platform 301 by sending a verification query 311 (e.g., real time or near-real time) of the received metadata to one or more of the collaboration services 305 and receiving from the queried collaboration services 305 an application security context 312. The attestation broker 304 may generate an application artifact 308 and may send the application artifact to the web application 302.

The web application 302 may include (for example, may embed, as a markup) the received application artifact 309 as an assertion (e.g., in a security assertion markup language (SAML or other common form of markup)) to the identity provider 303 which may use back-channel communications 310 with the attestation broker 304 to verify the application artifact 309.

In certain exemplary embodiments, the attestation broker (or attestation server) 304 may request a collaboration service 305 for an introspection based security context for the running application.

In various exemplary embodiments, the identity provider 303 may initiate a direct interactive authentication sequence with an interactive user 300 in the associated domain (e.g., realm). The login form (or web page) displayed to the user 300 may include an application attestation 313. The application attestation 313 may be in any perceivable indicator including an attestation icon for the accessed web application. For example, the attestation icon may include information about the web application 302, such as, for example, the identity, the product version, the publisher, the modification timestamp, and/or the confidence metrics. The user 300 may determine whether the information including the confidence metrics information is acceptable to continue with the transaction (e.g., to use of the running target application) and may provide proof of possession of credentials 314 to authenticate the user 300 to the identity provider 303.

Although user authentication is disclosed as occurring after the determination whether to continue the transaction to use the running application, it is contemplated that user authentication may occur at any stage of the login process and may occur prior to such a determination whether to use the running application.

In certain exemplary embodiments, values associated with the confidence metrics may be provided on a common scale (e.g., a scale of 1 to 10) and may be presented to the user 300 with a common visual scheme such as green to indicate a low risk for use of the target application, yellow to indicate a intermediate risk for use of the target application, and red to indicate a high risk for use of the target application.

In certain exemplary embodiments, the identity provider 303 may query 315 the attestation broker 304 to determine whether access to the web application 302, based on an authorization profile configured for the attestation broker 304, can be granted for the authenticated user 300 to transact data exchanges with the web application 302.

In various exemplary embodiments, the identity provider 303 may return standards based authentication, attribute and/or authorization statements or reports 316 to the web application 302. The web application 302 may selectively grant access to the user 300 for the target application on the instrumented platform 301 or may selectively block access by the user 300 to the target application on the instrumented platform 301 based on the application statements or reports 316 received from the attestation broker 304 and pre-established or system administrator established access or attestation policies.

The application statements or reports 316 may include, for example, information about the user's identity, one or more authentication factors such as password, PIN, smart card, among others, and preexisting roles in a user directory (for example, Active Directory, among others), a role based management system (for example, Oracle or SAP, among others) and/or a relational database (for example, MS-SQL, MySQL, or Oracle DB, among others). Access may also be granted or denied (blocked) based on a plurality of factors.

For example, the identity provider 303 may deny access to an authenticated user 300 based on the level of concern (e.g., high) in the confidence metrics for a specific classification (e.g., compliance). The level of concern for a classification of the confidence metrics may be expressed in user-to-application policy bindings provisioned for the attestation broker 304. The outcome of the policy decision logic, at or external to the attestation broker 304, may be returned to the web application 302, as one or more application statements or reports.

The identity provider 303 may represent an intermediate single sign-on (SSO) entity (or function) that may use identity stores (or caches) to manage passwords and may perform authentication ceremonies on behalf of the user 300. The authentication may be performed such that it is transparent to the user 300.

Figure 4:
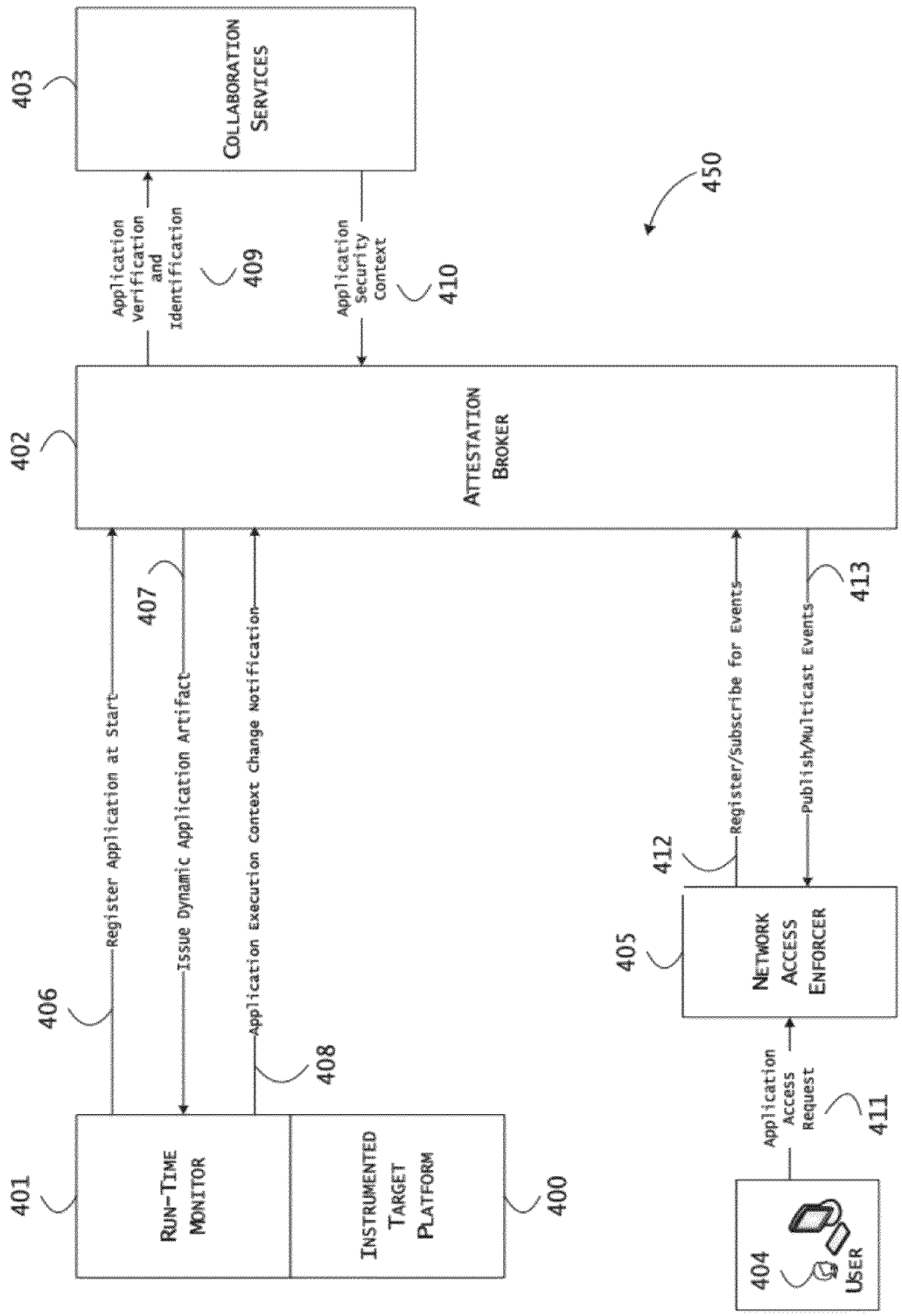
FIG. 4 is a schematic diagram illustrating a further method of monitoring and attesting applications in a cloud computing environment in accordance with various exemplary embodiments.

FIG. 4 is a schematic diagram illustrating a further method of monitoring and attesting applications in a cloud computing environment in accordance with various exemplary embodiments.

Referring to FIG. 4, an exemplary network 450 may include an instrumented target platform 400, a runtime monitor 401, an attestation broker 402, collaboration services 403, an interactive user 404, and/or a network access enforcer 405. The user 404 may establish a physical connection over network 450 and may initiate an application access request 411 to commence or initiate a transaction with a target application hosted on the instrumented target platform 401.

Applications running on the instrumented target platform 400 may be inspected by the runtime monitor 401 for application execution context and state changes. The operational flow may be an exemplary mechanism to apply, during or at the connection establishment phase of a session (e.g., an Internet Protocol (IP) or non-IP session), authorization controls at an intermediate system or apparatus in the data path.

The runtime monitor 401 may inspect the instrumented target platform 400 for application epochs (e.g., process and/or socket events). Responsive to detection of an application process start by the run-time monitor 401, the runtime monitor may generate a runtime application execution context (e.g., metadata), which may include, for example, the file hash digests and/or file attributes for loaded components of the running target application. The running target application may be registered by the runtime monitor 401 with the attestation broker 402 via a start notification 406 and the runtime application execution context (e.g., that may include the metadata) may be sent by the runtime monitor 401 to the attestation broker 402 via an application execution context change notification 408. In certain exemplary embodiments, the notifications 406 and 408 may occur together.

In certain exemplary embodiments, the attestation broker 402 may verify the authenticity of the running application on the instrumented target platform 400 with a real time or near real time exchange 409 of the received metadata with one or more collaboration services 403 and the return of the application security context 410 based on the exchanged metadata. The attestation broker 402 may also request on or more collaboration services 403 to perform a static, dynamic and/or virtual execution analysis of the executable file binary, for example, by a malware analysis system.

In certain exemplary embodiments, the attestation broker 402 may remediate an instrumented target platform 400, using manual or automated methods, in response to a requested analysis performed by one or more collaboration services 403.

The attestation broker 402 may generate a dynamic application artifact (e.g., that may be globally unique and may be time-sensitive) 407 and may issue the application artifact 407 to the runtime monitor 401. The runtime monitor 401 may inspect running applications on the instrumented target platform 400 for contextual (state) changes, including, for example, active listening and/or open network ports, (e.g., at the transport layer of the OSI stack), and terminations of applications.

In certain exemplary embodiments, other types of state changes may be inspected, such as elements related to the execution context. Contextual (or state) changes 408 (e.g., any contextual changes) may be notified in real time or near real time to the attestation broker 402. The attestation broker 402 may store persistent and transient state information in a local database or remote repository 210 (see FIG. 2) for registered running applications on a plurality of instrumented target platforms 400.

A network access enforcer 405 may register or subscribe with the attestation broker 402 as a web service over a web services protocol interface 412:413 for notifications (e.g., publications) of application statements or reports (e.g., claims) for running applications (e.g., all running applications) on a plurality of instrumented target platforms 400. The attestation broker 402 may publish in real time or near real time, up-to-date application statements or reports 413 to a plurality of subscribers 405 or users 404. The application statements or reports may include (1) an application identifier such as a registered name (e.g., a globally unique service principle name), (2) a machine identifier, (3) a product identifier, (4) a product version, (5) active listening and/or open network ports, (6) network addresses used by the target application, and/or (7) confidence metrics based on security context assessments 410 performed by one or more collaboration services 403. The confidence metrics may be based on: (1) recent (e.g., the most recent) security context assessments performed by one of the collaboration services 403, (2) correlated data from different collaboration services 403, and/or (3) weighed averages associated with each security context assessment, among others.

The network access enforcer 405 may query the attestation broker 402 for user specific application bindings configured for the attestation broker 402 to determine authorization controls based on dynamic multi-factor application attestation, and real time (or near real time) confidence metrics based on the local execution context 408 and assessed security context 410. For example, the network access enforcer 405, such as a virtual or physical network firewall appliance, may deny access to an authenticated user based on the level of concern ("high") (for example, from a three level ranking system of "high", "medium" and "low") in the confidence metrics for a specific classification (e.g., patch level) as expressed in the user-to-application policy bindings provisioned for the attestation broker 402. Although a three level ranking system is illustrated, it is contemplated that ranking systems with more or less levels are possible.

FIG. 5 is a schematic diagram illustrating a method of monitoring and attesting a Simple Authentication and Security Layer (SASL) enabled client and server application in accordance with various exemplary embodiments.

Referring to FIG. 5, an exemplary network 550 may include a client application 500, a server application 501, an attestation broker 502, a collaboration service 503, and/or an application programming interface (API) library 516.

Although a Simple Authentication Security Layer (SASL) protocol is illustrated, it is contemplated that any application layer protocol between client-server and peer-to-peer applications, or network security protocols, for example IPSec Authenticated Internet Protocol (AuthIP) or Internet Key Exchange (IKE), may be extended and/or used to provide the functions of the client application 500 and the server application 501.

In certain exemplary embodiments, the client application 501 and the server application 501 may be statically or dynamically linked to the API library 516 (e.g., a Trust-as-a-Service (TAAS) API library). The API library 516 may implement a set of procedure calls for applications to exchange messages (e.g., opaque and/or secure messages) with an attestation service or broker 502 that may hide the implementation details from the higher level application.

Although one exemplary embodiment is illustrated for the API library 516, it is contemplated that any application framework may be extended to implement the set of procedure calls provided by the API library 516.

The server application 501 may send a runtime server application execution context 504, may request a server application artifact 505, and may receive the server application artifact 505 from the attestation service (e.g., the attestation broker or the attestation server) 502. The application execution context 504 may include the file hash digests and file attributes of components of the running server application 501 including parent-child process associations and loader dependencies.

The client application 500 may establish a network connection to the server application 501 and may initiate a profile exchange for authentication.

Subsequent to completing an authentication exchange (for example to authenticate the user associated with the client application 500), the client application 500 may send a runtime client application execution context 506 and may request a client application artifact 507 from the attestation broker or service or server 502. The client application execution context 506 may include the file hash digests and file attributes of components of the running client application 500 including parent-child process associations and loader dependencies. Responsive to or after receiving a client application artifact 507, the client application 500 may transmit the received application artifact (indicated as 508) to the server application 501. The server application 501 may send the received client application artifact 507 to the attestation server 502 for client artifact validation 509 and may request a client application statement or report 511 for the client application 500.

In certain exemplary embodiments, the attestation broker 502 may initiate a request 520 for an introspection based security context 510 for the client application 500 from one or more of the collaboration services 503. The requested collaboration services 503 may collect and may generate the client application security context 510 and may send the client application security context 510 to the attestation broker 502. The client application statement or report 511 may be generated by the attestation broker 502 from the client application security context 510 and may include assertions about the runtime execution context 504 and intelligence based security context 510 for the client application 500. Responsive to receiving the client application statement or report 511 from the attestation server 502, the server application 501 may determine whether the attestation of the client application 500 is adequate.

In certain exemplary embodiments, the confidence metrics may be included in the client application statements or reports 511 and may be analyzed, for example by the server application 501, to determine whether to transact data exchanges with the client application 500.

Upon or after receiving the client application statements 511 and determining to transact data exchanges with the client application 500, the server application 501 may transmit the received server application artifact (indicated as 512) to the client application 500. The client application 500 may send the received server application artifact 512 to the attestation server 502 for validation of the server artifact 513 and may request an application statement or report 515 for the server application 501.

In certain exemplary embodiments, the attestation broker 502 may initiate a request 519 for an introspection based security context 514 for the server application 501 from one or more of the collaboration services 503. The requested collaboration services 503 may collect and may generate the server application security context 514 and may send the server application security context 514 to the attestation broker 502. The server application statement or report 515 generated by the attestation broker 502 may include assertions about the runtime execution context and intelligence based security context for the server application 501. Responsive to or after receiving the server application statement or report 515 from the attestation broker or service 502, the client application 500 may determine whether the attestation of the server application 501 is adequate. In certain exemplary embodiments, the confidence metrics included in the server application statement may be analyzed, for example by the client application, to determine whether to transact data exchanges with the server application 501.

Although confidence metrics included in the application statements may be analyzed by the requesting application, in certain exemplary embodiments, the API library 516 may provide standard and/or custom pluggable filters to normalize the classifications based confidence metrics such that a standard rating scale may be provided to each requesting application and the requesting application may predetermine settings for denying access to an application with a particular rating exceeding a risk threshold and/or granting access to the application with the particular rating equal to or not-exceeding the risk threshold. In certain exemplary embodiments, application at or near the risk threshold may be temporarily denied access pending further analysis based on additional collaborative services 503 or based on user of system administrator input granting or denying such access.

FIG. 6 is a schematic diagram illustrating an exemplary security administration console 650 including an integrity dashboard 600 in accordance with various exemplary embodiments of the invention.

Referring to FIG. 6, the exemplary security administration console 650 may visually display the integrity dashboard or display window 600. The integrity dashboard or display window 600 may include information fields including a dashboard clock 601, discovered and identified applications 602, service realms 603, instrumented target platforms 604, product vendors 605, product versions 606, active network service ports 607, and confidence metrics 608.

The information fields may be displayed and/or updated in real time or near real time. For example, the identified and attested application 602 running on the instrumented target platform 604, service realms 603, product vendors 605, product versions 606, current classifications based confidence metrics 608 and currently active network service ports 607 for the application may be displayed on an integrity dashboard 600 in near real time as indicated by the dashboard clock 601. The dashboard 600 may include administrative controls (not shown) to create filters for perspective views, and issue security alerts based on a plurality of defined criteria and/or provide companion reporting services.

Although the integrity dashboard is shown with specific information fields and in a particular arrangement, it is contemplated that other information fields and arrangements are possible. For example, additional attributes included in the application statements or reports or other network management information available from network management systems may also be displayed.

Figure 7:
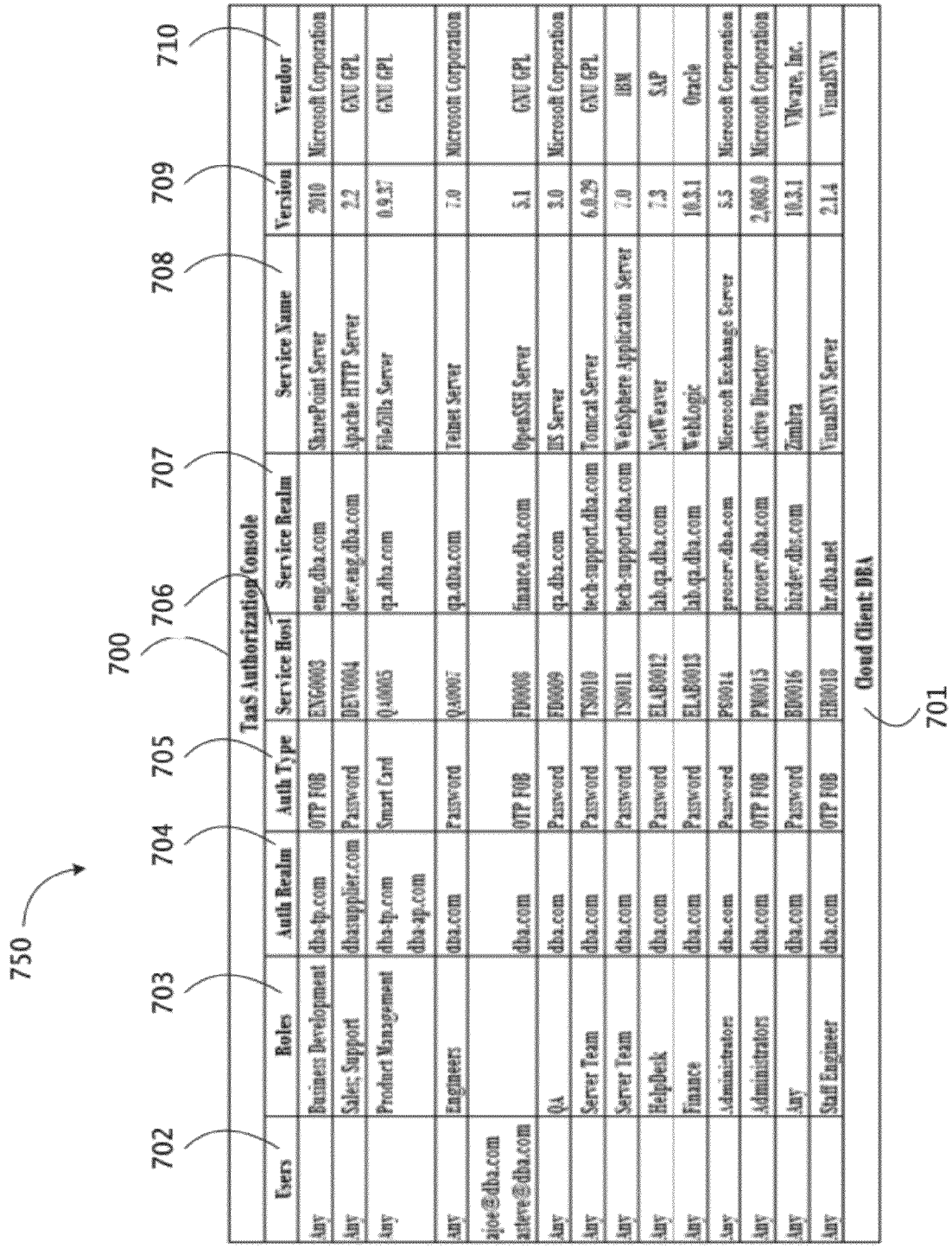
FIG. 7 is a schematic diagram illustrating another exemplary policy administration console including an authorization dashboard in accordance with various exemplary embodiments.

FIG. 7 is a schematic diagram illustrating another exemplary policy administration console 750 including an authorization dashboard 700 in accordance with various exemplary embodiments of the invention.

Referring to FIG. 7, the authorization dashboard or controls window 700 may include information fields provisioned and parsed by for example a cloud client (or tenant) 701 and may include users 702, roles 703, authentication realms 704, authentication types 705, instrumented service hosts (or target platforms) 706, service realms 707, identified and attested applications 708, product versions 709 and/or product vendors 710.

The authorization dashboard 700 for each cloud client 701 may include a plurality of policy components (or rules) for defining a policy (or rule set) for the user 702, a plurality of users, roles 703 or a plurality of roles and an attested application instance 707:708. The dashboard 700 may include administrative controls (not shown) to create filters for perspective views, and issue security alerts based on a plurality of defined criteria and/or provide companion reporting services. The filters may enable, for example, filtering of an authenticated user by an authentication type (or authentication method) 705 for a runtime access control decision. Each row of the illustrated authorization dashboard 700 includes information fields (e.g., contents) that may represent (or correspond to) a statement of policy created by the system administrator for the cloud client 701.

In certain exemplary embodiments, federation of services across different hosting realms may be displayed such that a user authenticated in one authentication domain (or realm) may be provisioned with policy based access to an application hosted in a different target services domain (or realm).

In certain exemplary embodiments, the attestation broker 102, for example, may be configured to service requests for application artifacts and application statements across a plurality of hosting realms.

Although the integrity and authorization dashboard is shown with specific information fields and in a particular arrangement, it is contemplated that other information fields and arrangements are possible and that these dashboards may be parsed using any one of the information fields to generate a different perspective view.

The access control policies created by the system administrator of the cloud client using the authorization dashboard (or console) may be based on runtime context-aware logical attributes pertaining to an attested running application instance such that the contextual information for the attestation may include the runtime local execution context and an introspected security context. There are no physical constraints wherein rules may require network topology based static attributes, including at least one of: an IPv4/IPv6 address, a port number, a MAC address, a network identifier, a subnet, a VLAN identifier, or combinations or variants thereof.

Although various embodiments have been described in terms of creating context-aware policies in a cloud environment, it is not limited thereto. The methods may be carried out, for example, between any numbers of computer systems maintaining secure transactions among themselves.

FIG. 8 is a flowchart illustrating a method 800 in accordance with various exemplary embodiments.

Referring to FIG. 8, the method 800 may provide an attestation service or broker 109 for an application at runtime executing on a computing platform 101 using an attestation server 109. At block 810, the attestation server 109 remote from the computing platform 101 may receive: (1) a runtime execution context 105 indicating attributes of the application at runtime, and (2) a security context 111 providing security information about the application. At block 820, the attestation server 109 may generate a report 117 indicating security risks associated with the application based on the received runtime execution context 105 and the received security context 111, as an attestation result. At block 830, the attestation server 109 may send the attestation result associated with the application.

In certain exemplary embodiments, at block 830, the attestation server 109 may also send an automated remediation request to a collaboration service 110 (for example, an orchestration service) to initiate operations on an instrumented platform 100 (for example, to reimage, snapshot or quarantine the instrumented platform) based on the attestation result associated with one or more applications (103, 104).

In certain exemplary embodiments, the attestation server 109 may generate an application artifact 108 as a reference for changes in a subsequent execution context 105 and may send the generated application artifact 108 such that subsequent changes to the runtime execution context 105 are tracked based on the generated application artifact 108.

In certain exemplary embodiments, the attestation results and the application artifact 108 may be digitally signed.

In certain exemplary embodiments, the received security context 111 may be an introspective security context and the attestation server 109 may generate one or more security assertions that pertain to the received runtime execution context 105 and the received introspective security context 111.

In certain exemplary embodiments, a user's transaction with the application may be controlled by applying a set of authorization rules in accordance with the attestation results. In these and other exemplary embodiments, a user's network access to the application may be controlled based on the set of authorization rules and the attestation results.

In certain exemplary embodiments, confidence metrics in the attestation results may be provided which indicate a level of security risk by different classifications such that a restriction on a user's transaction with the application may be applied based on the level of security risk indicated by the confidence metrics in the attestation results.

In certain exemplary embodiments, the restriction on the user's transaction may include the application of routing decisions and the redirection of the user to an alternate computer platform.

FIG. 9 is a flowchart illustrating a method 900 in accordance with various exemplary embodiments.

Referring to FIG. 9, the method 900 may provide an attestation service for an application at runtime executing on a computing platform 101 using a runtime monitor 102. At block 910, the runtime monitor 102 at the computing platform 101 may generate a runtime execution context 105 indicating attributes of the application at runtime. At block 920, the runtime monitor 102 may send the runtime execution context 105 to the attestation server 109. At block 930, the runtime monitor may receive an application artifact 107 for tracking subsequent changes to the runtime execution context 105. At block 940, the runtime monitor 102 using an application artifact 107 may update and may send the runtime execution context 105, as an updated execution context, responsive to the attributes of the application indicating a change.

In certain exemplary embodiments, the generation of the runtime execution context 105 may include the runtime monitor 102 inspecting running application processes on the computing platform 101 and generating metadata that includes at least a local runtime execution context.

Figure 10:
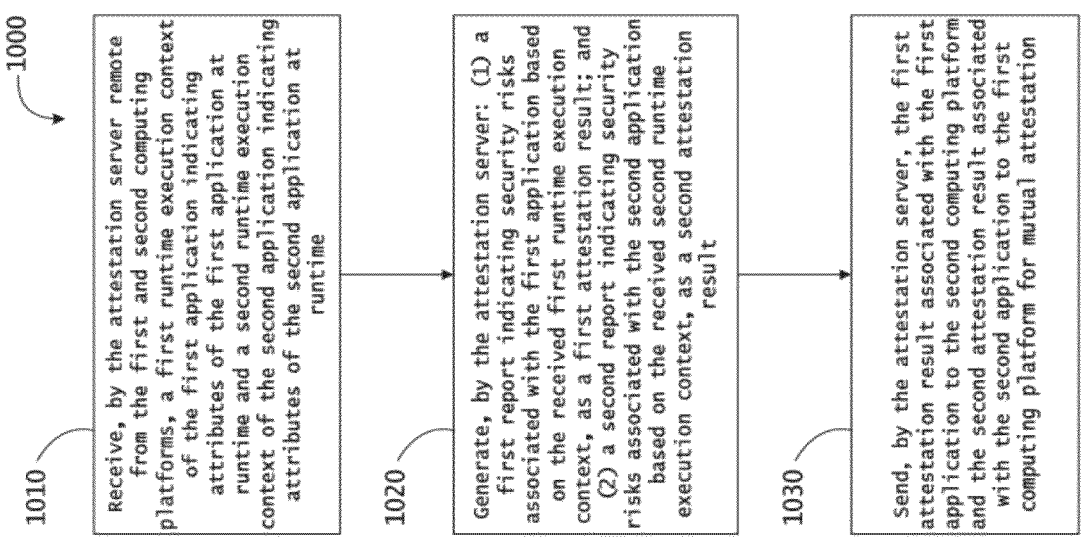
FIG. 10 is a flowchart illustrating a method in accordance with various exemplary embodiments of the presently disclosed technology.

FIG. 10 is a flowchart illustrating a method 1000 in accordance with various exemplary embodiments.

Referring to FIG. 10, the method 1000 may provide mutual attestation for first and second interrelated applications 500 and 501 at runtime using an attestation server 502. The first application 500 may run on a first computing platform 530 and the second application 501 may run on a second computing platform 531. At block 1010, the attestation server 502 remote from the first and second computing platforms 530 and 531 may receive a first runtime execution context 506 of the first application 500 indicating attributes of the first application 500 at runtime and a second runtime execution context 504 of the second application 501 indicating attributes of the second application 501 at runtime. At block 1020, the attestation server 502 may generate: (1) a first report 515 indicating security risks associated with the first application 500 based on the received first runtime execution context 506, as a first attestation result; and (2) a second report 511 indicating security risks associated with the second application 501 based on the received second runtime execution context 504, as a second attestation result. At block 1030, the attestation server 502 may send the first attestation result associated with the first application 500 to the second computing platform 531 and the second attestation result associated with the second application 501 to the first computing platform 530 for mutual attestation.

In certain exemplary embodiments, a web browser may render an icon indicating that the first attestation result has been sent and responsive to user selection of the icon, may render the attestation result about the first application which is a web application accessed via the web browser.

In certain exemplary embodiments, the attestation server 502 may generate a first application artifact 507 as a reference for changes in a subsequent execution context of the first application 500 and a second application artifact 505 as a reference for changes in a subsequent execution context of the second application 501; and may send the generated application artifacts 507 and 505 such that subsequent changes to the first and second runtime execution contexts 506 and 504 may be tracked in the first and second interrelated applications 500 and 501 based on the generated first and second application artifacts 507 and 505, respectively.

In certain exemplary embodiments, access by a requestor, for example a user 115, to the first application 500 may be controlled based on the first attestation results and independently based on the second attestation results.

Figure 11:
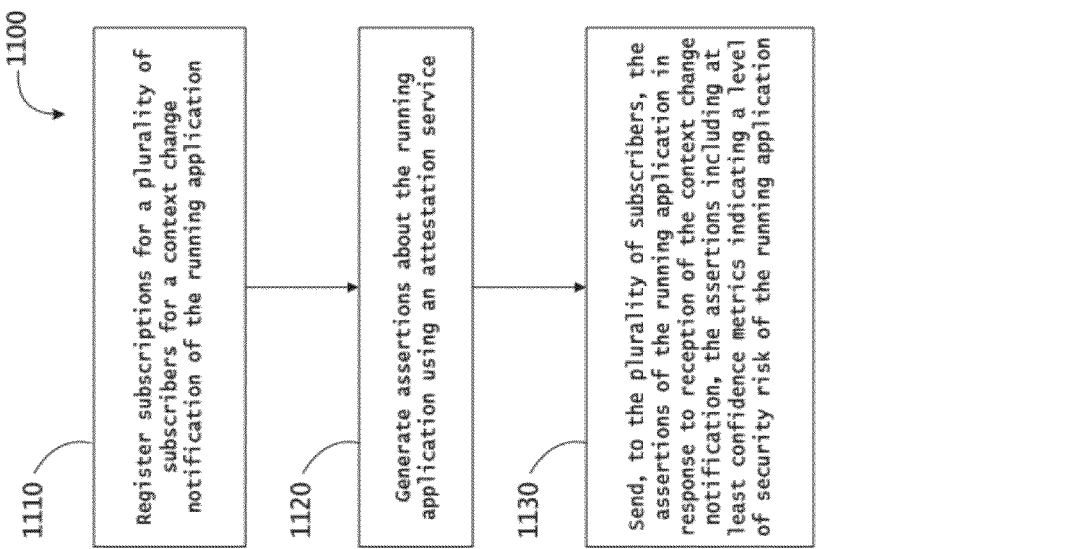
FIG. 11 is a flowchart illustrating a method in accordance with various exemplary embodiments of the presently disclosed technology.

FIG. 11 is a flowchart illustrating a method of providing attestation of a running application in accordance with various exemplary embodiments.

Referring to FIG. 11, the method 1100 may provide attestation of a running application (e.g., web or non-web applications). At block 1110, the attestation server 402 may register subscriptions for a plurality of subscribers 412 or users 300 for context change notifications 408 of the running application. At block 1120, the attestation service or server 402 may generate assertions about the running application. At block 1130, the attestation service or server 402 may send to the plurality of subscribers 412 or users 300, the assertions of the running application in response to reception of the context change notification 408. The assertions may include at least confidence metrics indicating a level of security risk of the running application.

Figure 12:
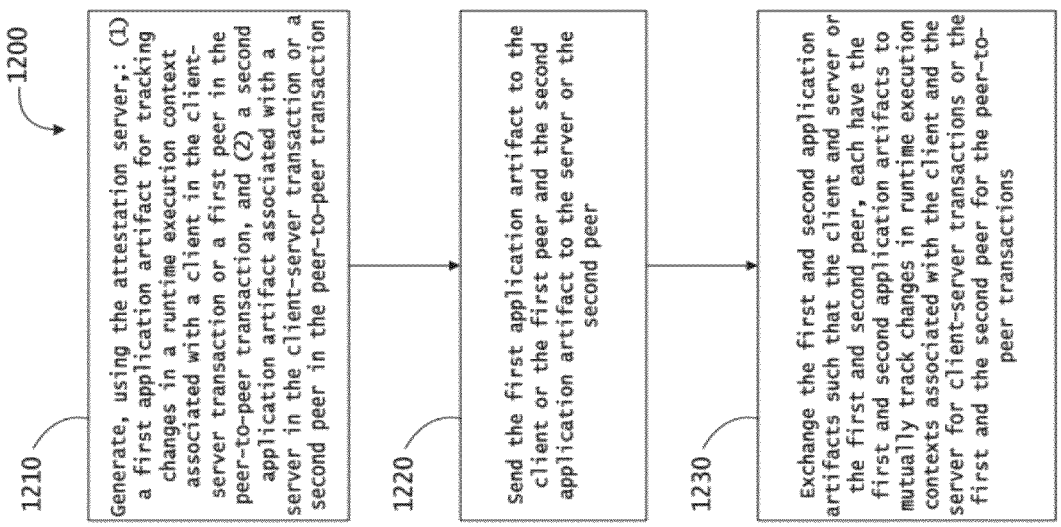
FIG. 12 is a flowchart illustrating a method in accordance with various exemplary embodiments of the presently disclosed technology.

FIG. 12 is a flowchart illustrating a method 1200 in accordance with various exemplary embodiments.

Referring to FIG. 12, the method 1200 may provide mutual attestation of applications in client-server or peer-to-peer transactions using an attestation server. At block 1210, the attestation server 502 may generate (1) a first application artifact 507 for tracking changes in a runtime execution context 506 associated with a client 530 in the client-server transaction, and (2) a second application artifact 505 associated with a server 531 in the client-server transaction. At block 1220, the attestation server 502 may send the first application artifact 507 to the client 530 and the second application artifact 505 to the server 531. At block 1230, the first and second application artifacts 507 and 505 may be exchanged such that the client 530 and the server 531 each have the first and second application artifacts 507 and 505 to mutually track changes in runtime execution contexts 506 and 504 associated with the client 530 and the server 531 for client server transactions.

Although a client-server transaction between a client and a server is shown, it is contemplated that mutual attestation may be provided by an attestation server between first and second peers or among first, second and/or further peers in a peer-to-peer environment.

Figure 13:
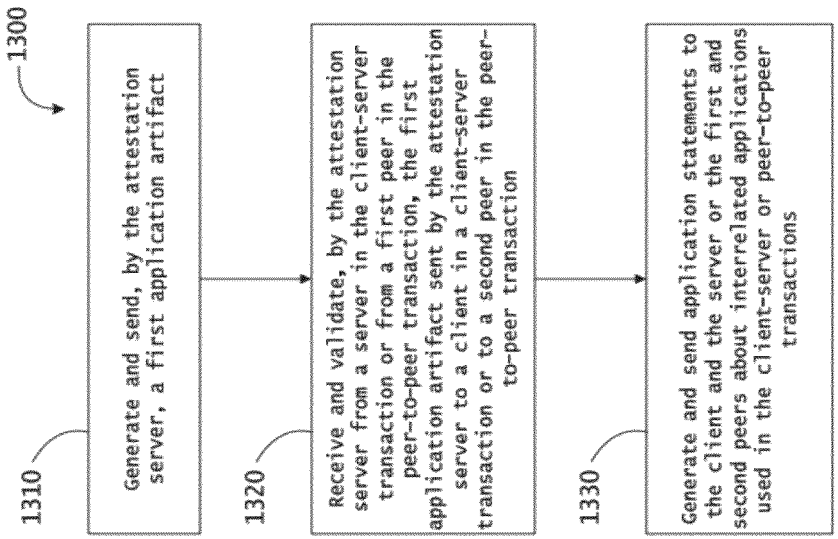
FIG. 13 is a flowchart illustrating a method in accordance with various exemplary embodiments of the presently disclosed technology.

FIG. 13 is a flowchart illustrating a method 1300 in accordance with various exemplary embodiments.

Referring to FIG. 13, the method 1300 may provide mutual attestation of applications in client-server or peer-to-peer transactions using an attestation server. At block 1310, the attestation server 502 may generate and send a first application artifact 507. At block 1320, the attestation server 502 may receive and validate from a server 531 in the client-server transaction, the first application artifact 507 sent by the attestation server 502 to a client 530 in a client server transaction. At block 1330, the attestation server 502 may generate and send application statements 511 and 515 to the client 530 and the server 531 about interrelated applications 500 and 501 used in the client-server transaction. For example, the sending of the application statements 511 and 515 to the client 530 and the server 531 may include: sending by the attestation server 502: (1) the application statement 511 regarding a client application 500 of the interrelated applications 500:501 to the server 531 of the client-server transaction and the application statement 515 regarding a server application 501 of the interrelated applications 500:501 to the client 530 of the client-server transaction.

In certain exemplary embodiments, the attestation server 502 may generate and send a second application artifact 505, may receive the second application artifact 505 from a client 530 in the client server transaction and may validate the second application artifact 505 sent by the attestation server 502 to a server 531 in a client server transaction.

In certain exemplary embodiments, a method of providing attestation services for applications at runtime may include one or more of the following steps: hosting, by an instrumented target platform, a target user or service program; generating, by an application attestation service: (1) a globally unique, opaque, time-sensitive application artifact; and (2) at least one application statement including a plurality of assertions pertaining to an inspection based runtime local execution context and an introspection based security context; inspecting, by a runtime monitor, running application processes on the instrumented target platform; generating, by the runtime monitor, metadata that includes at least the runtime local execution context; authenticating, by an identity provider, a user to a web application; providing an attestation of the local execution and introspected security context of the web application based on a web services request; controlling, by a network access enforcer, access of an authenticated user to a target application using a subscription based application attestation service; and/or providing, by a collaboration service, the introspected based security context for the target application running on the instrumented target platform.

In certain exemplary embodiments, a method for providing attestation of the authenticity of a running web application or web servlet may include one or more of the following steps: requesting an application artifact for a running web application or servlet instance; establishing a secure channel between the web server and the attestation server; generating at least one hash file digest corresponding to the execution context of the web application or servlet instance; determining at least one file attribute corresponding to at least one element or the execution context of the web application or web servlet instance; sending an application report to an identity provider; generating assertions based on a received security context and a received local execution context; transmitting confidence metrics in the report to the identity provider; and/or providing attestation of the running web application or web servlet as a digital icon for rendering by a web browser.

In certain exemplary embodiments, the attestation may be provided prior to (1) commencing any data exchange in an established connection with a user; and/or (2) establishing a network connection with a user.

In certain exemplary embodiments, the rendering of attestation information about a web application to be accessed may be responsive to user input.

In certain exemplary embodiments, a system for continuously monitoring running applications hosted on self-managed and on-premise, or on outsourced service provider managed infrastructure may include one or more of the following: an instrumented target platform for hosting a target user or service program; an application attestation service for generating a globally unique, opaque, and time-sensitive application artifact and application statements including a plurality of assertions pertaining to inspection based runtime local execution context and introspection based security context; a runtime monitor for discovering, identifying and inspecting running application processes on the instrumented target platform and for generating metadata that includes at least the runtime local execution context; a collaboration service to provide introspected security context for a target application running on the instrumented target platform; and/or a graphical user interface for: (1) requesting and receiving dynamic assertions from a metadata repository of the attestation service, the dynamic assertions pertaining to the local execution context the introspected security context of running application instances on instrumented target platforms; (2) for continuously displaying the dynamic assertions to a system administrator; and for provisioning and dispatching alerts based on the dynamic assertions and predefined criteria.

In certain exemplary embodiments, the network access enforcer may subscribe for and receives dynamic application statements from the attestation service to analyze the contextual assertions and to determine whether an authenticated user is permitted or denied network access to an attested application instance.

In certain exemplary embodiments, the graphical user interface may display the applications running on instrumented target platform on a client specific dashboard or portal, and may present for each associated application execution context at least one of: (1) a service hostname; (2) a service realm; (3) a service principal name; (4) a product version; (5) product vendor; (6) one or more classifications based confidence metrics; or (7) an active network service port.

In certain exemplary embodiments, the identity provider may query for dynamic application statements from the attestation server to analyze the contextual assertions and to determine whether an authenticated user is permitted or denied authorization to transact data exchanges with an attested application instance in an established connection.

In certain exemplary embodiments, the network access enforcer may analyze classifications based confidence metrics included in received dynamic application statements, based on a subscription, from the attestation service to determine whether an authenticated user is permitted or denied network access to an attested application instance.

In certain exemplary embodiments, the identity provider may analyze classifications based confidence metrics included in received dynamic application statements, based on a subscription, from the attestation service to determine whether an authenticated user is permitted or denied authorization to transact data exchanges with an attested application instance in an established connection.

In certain exemplary embodiments, a method for creating context-aware policies for network connections or data exchange transactions between authenticated users and attested running applications hosted on self-managed and on-premise, or on outsourced service provider managed infrastructures may include one or more of the following steps: hosting, by an instrumented target platform, a target user or service program; generating, by an application attestation service, a globally unique, opaque, and time-sensitive application artifact and application statements comprising of a plurality of assertions pertaining to inspection based runtime local execution context and introspection based security context; discovering, identifying and inspecting, by a runtime monitor, running application processes on the instrumented target platform, by a runtime monitor, metadata that generate, includes at least the runtime local execution context; authenticating, by an identity provider, a user to a web application based on a web services request to provide attestation of the local execution and introspected security context of the web application; controlling, by a network access enforcer, access of an authenticated user to a target application using the application attestation service that is subscription based; providing, by a collaboration service, an introspected security context for the target application running on the instrumented target platform; and/or creating, using a graphical user interface, access control rules for users annotated by a distinguished name in a user directory or database, and applications annotated by a registered globally unique security principal name.

In certain exemplary embodiments, context-aware access control policies may be created that stipulate acceptable thresholds for authorizations on the basis of dynamic classifications based confidence metrics.

Figure 14:
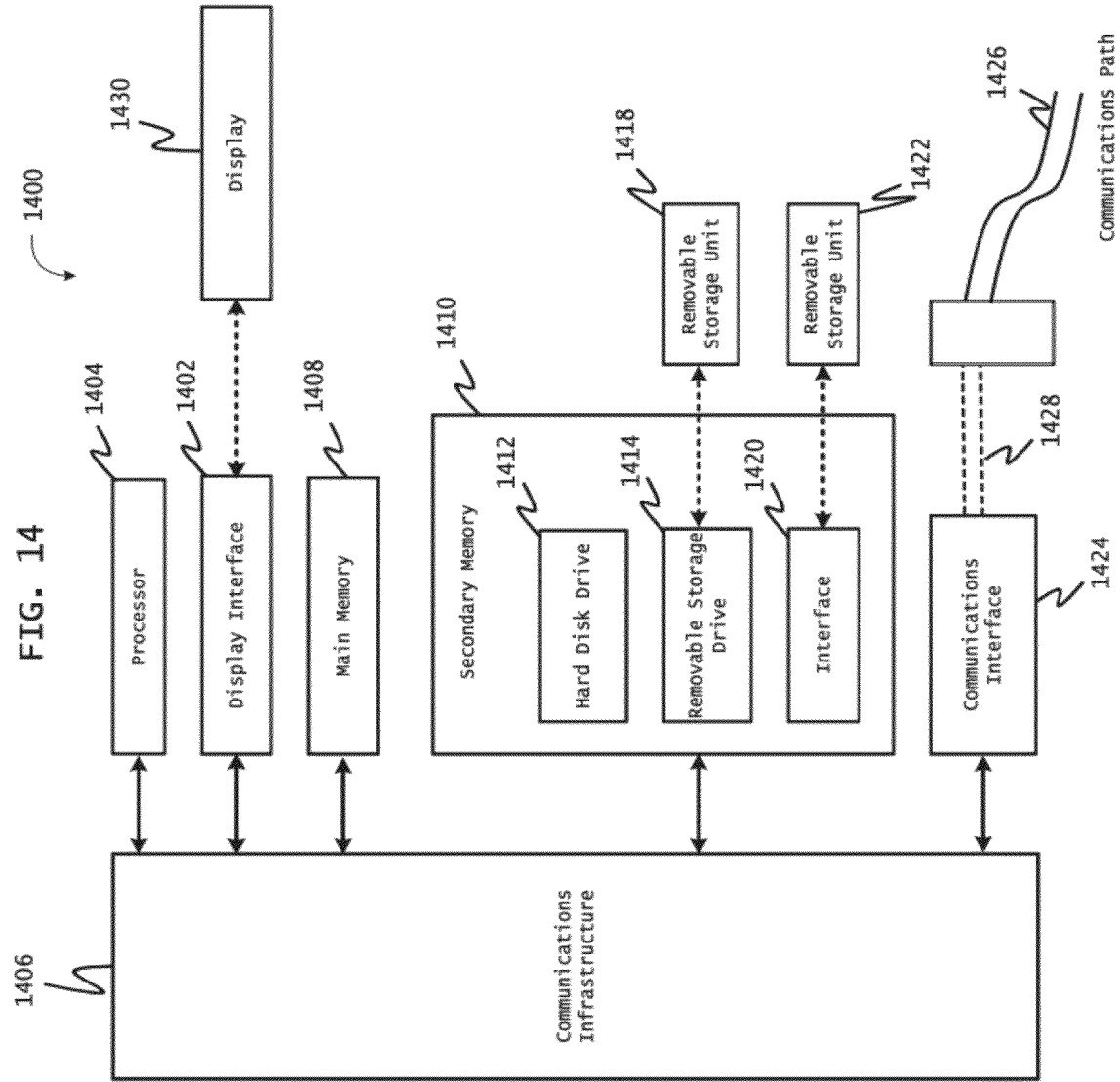
FIG. 14 is a diagram of an example computer system in which embodiments can be implemented.

Although exemplary embodiments have been described in terms of a computing device or instrumented platform, it is contemplated that it may be implemented in software on microprocessors/general purpose computers such as the computer system 1400 illustrated in FIG. 14. In various embodiments, one or more of the functions of the various components may be implemented in software that controls a computing device, such as computer system 1400, which is described below with reference to FIG. 14.

Aspects of the present invention shown in FIGS. 1-13, or any part(s) or function(s) thereof, may be implemented using hardware, software modules, firmware, non-transitory computer readable media having instructions stored thereon, or a combination thereof and may be implemented in one or more computer systems or other processing systems.

FIG. 14 illustrates an example computer system 1400 in which embodiments of the present invention, or portions thereof, may be implemented as computer-readable code. For example, network systems 150, 250, 340, 450 and 550 of FIGS. 1-5, can be implemented in computer system 1400 using hardware, software, firmware, non-transitory computer readable media having instructions stored thereon, or a combination thereof and may be implemented in one or more computer systems or other processing systems. Hardware, software, or any combination of such may embody any of the modules and components used to implement the network systems of FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1404 may be a special purpose or a general purpose processor device. As will be appreciated by persons skilled in the relevant art, processor device 1404 may also be a single processor in a multi-core/multiprocessor system, such system operating alone, or in a cluster of computing devices operating in a cluster or server farm. Processor device 1404 is connected to a communication infrastructure 1406, for example, a bus, message queue, network, or multi-core message-passing scheme.

Computer system 1400 also includes a main memory 1408, for example, random access memory (RAM), and may also include a secondary memory 1410. Secondary memory 1410 may include, for example, a hard disk drive 1412, removable storage drive 1414. Removable storage drive 1414 may comprise a floppy disk drive, a magnetic tape drive, an optical disk drive, a flash memory, or the like.

The removable storage drive 1414 reads from and/or writes to a removable storage unit 1418 in a well known manner. Removable storage unit 1418 may comprise a floppy disk, magnetic tape, optical disk, etc. which is read by and written to by removable storage drive 1414. As will be appreciated by persons skilled in the relevant art, removable storage unit 1418 includes a non-transitory computer usable storage medium having stored therein computer software and/or data.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Communications interface 1424 may include a modem, a network interface (such as an Ethernet card), a communications port, a PCMCIA slot and card, or the like. Software and data transferred via communications interface 1424 may be in the form of signals, which may be electronic, electromagnetic, optical, or other signals capable of being received by communications interface 1424. These signals may be provided to communications interface 1424 via a communications path 1426. Communications path 1426 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 1418, removable storage unit 1422, and a hard disk installed in hard disk drive 1412. Signals carried over communications path 1426 can also embody the logic described herein. Computer program medium and computer usable medium can also refer to memories, such as main memory 1408 and secondary memory 1410, which can be memory semiconductors (e.g. DRAMs, etc.). These computer program products are means for providing software to computer system 1400.

Computer programs (also called computer control logic) are stored in main memory 1408 and/or secondary memory 1410. Computer programs may also be received via communications interface 1424. Such computer programs, when executed, enable computer system 1400 to implement the present invention as discussed herein. In particular, the computer programs, when executed, enable processor device 1404 to implement the processes of the present invention, such as the stages in the methods illustrated by the flowcharts 800, 900, 1000, 1100, 1200 and 1300 of FIGS. 8-13, discussed above. Accordingly, such computer programs represent controllers of the computer system 1400. Where the invention is implemented using software, the software may be stored in a computer program product and loaded into computer system 1400 using removable storage drive 1414, interface 1420, and hard disk drive 1412, or communications interface 1424.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A method of providing an attestation service for an application at runtime executing on a computing platform using an attestation server, comprising:
   receiving, by the attestation server remote from the computing platform:
      a runtime execution context indicating attributes of the application at runtime, wherein the attributes comprise one or more executable file binaries of the application and loaded components of the application; and
      a security context providing security information about the application, wherein the security information comprises an execution analysis of the one or more executable file binaries and the loaded components;
   generating, by the attestation server, a report indicating security risks associated with the application based on the received runtime execution context and the received security context, as an attestation result; and
   sending, by the attestation server, the attestation result associated with the application.

2. The method of claim 1, further comprising:
   generating, by the attestation server, an application artifact as a reference for changes in a subsequent execution context; and
   sending the generated application artifact such that subsequent changes to the runtime execution context are tracked based on the generated application artifact.

3. The method according to claim 2, further comprising digitally signing the attestation results,
   wherein the attributes further comprise parent-child process associations of the application.

4. The method of claim 1, wherein the received security context is an introspective security context, and wherein the execution analysis is a static, dynamic, or virtual analysis of the one or more executable file binaries and the loaded components.

5. The method of claim 4, wherein the generating of the report indicating security risks associated with the application includes generating, by the attestation server, one or more security assertions that pertain to the received runtime execution context and the received introspective security context.

6. The method according to claim 1, further comprising authenticating the application using a plurality of collaboration services.

7. The method according to claim 1, further comprising controlling a user's transaction with the application by applying a set of authorization rules in accordance with the attestation results.

8. The method according to claim 1, further comprising controlling a user's network access to the application by applying a set of authorization rules in accordance with the attestation results.

9. The method according to claim 1, further comprising providing confidence metrics in the attestation results indicating a level of security risk by different classifications such that a restriction on a user's transaction with the application are applied based on the level of security risk indicated by the confidence metrics in the attestation results.

10. The method according to claim 9, wherein the application of the restriction on the user's transaction includes applying the restriction on the user's network access to the application.

11. The method according to claim 1, wherein the application of the restriction on the user's transaction includes applying routing decisions and redirecting the user to an alternate computer platform.

12. The method according to claim 1, further comprising controlling, by a network access enforcer, access of a user to the application based on the attestation result.

13. A non-transitory computer readable medium having instructions stored thereon that, if executed by a computing device, cause the computing device to perform operations for providing mutual attestation of applications in client-server or peer-to-peer transactions using an attestation server, the operations comprising:
  generating and sending, by the attestation server, a first application artifact that dynamically and opaquely identifies:
    an instance of a first application; and
    a record of a current execution state of the first application;
  receiving and validating, by the attestation server, from a server in the client server transaction or from a first peer in the peer-to-peer transaction, the first application artifact sent by the attestation server to a client in a client server transaction or to a second peer in the peer-to-peer transaction;
  generating and sending application statements to the client and the server or the first and second peers about interrelated applications used in the client-server or peer-to-peer transactions.

14. The computer readable medium of claim 13, the operations further comprising:
  generating and sending, by the attestation server, a second application artifact that dynamically and opaquely identifies:
    an instance of a second application; and
    a record of a current execution state of the second application;
  receiving and validating, by the attestation server, from a client in the client server transaction or from a second peer in the peer-to-peer transaction, the second application artifact sent by the attestation server to a server in a client server transaction or to a first peer in the peer-to-peer transaction.

15. The computer readable medium of claim 14, wherein: sending the application statements comprises the following operations:
  sending, by the attestation server:
    an application statement regarding a client application of the interrelated applications to the server of the client-server transaction and the application statement regarding a server application of the interrelated applications to the client of the client-server transaction; or
    an application statement regarding a first peer application of the interrelated applications to the second peer of the peer-to-peer transaction and the application statement regarding a second peer application of the interrelated applications to the first peer of the peer-to-peer transaction; and
  determining, based at least in part upon the sent application statements, whether or not to exchange data with associated applications.

16. The computer readable medium of claim 15, wherein:
generating the application statements comprises including confidence metrics and contextual assertions in the application statements; and
determining includes:
  comparing respective confidence metrics to a set of rules; and
  determining whether or not to exchange data based on the comparison.

17. A method for providing attestation of the authenticity of a running web application or web servlet using an attestation server, comprising:
  requesting an application artifact that is a dynamic, opaque reference to a running web application or servlet instance;
  establishing a secure channel between the web server and the attestation server;
  generating at least one digital signature corresponding to the execution context of the web application or servlet instance;
  determining at least one parent-child process association corresponding to the execution context of the web application or web servlet instance;
  sending an application report to an identity provider;
  generating assertions based on a received security context and a received local execution context;
  transmitting confidence metrics in the report to the identity provider; and
  providing attestation of the running web application or web servlet as a digital icon for rendering by a web browser.

18. The method according to claim 17, wherein the providing is prior to commencing any data exchange in an established connection with a user.

19. The method according to claim 17, wherein the providing is prior to establishing a network connection with a user.

20. The method according to claim 19, further comprising rendering attestation information about the web application to be accessed responsive to user input.

21. A system for continuously monitoring running applications hosted on self-managed and on-premise, or on outsourced service provider managed infrastructure comprising:
  an instrumented target platform for hosting target, running applications;
  an application attestation service for:
    generating globally unique, opaque, and time-sensitive application artifacts identifying records of current execution states and application statements for the target, running applications including a plurality of assertions pertaining to inspection based runtime local execution context and introspection based security context; and remediating the instrumented target platform, wherein the remediating includes one or more of: a reimage, a snapshot, or a quarantine of the instrumented target platform;

a runtime monitor for;
   discovering, identifying and inspecting running application processes on the instrumented target platform, wherein the discovering includes analysis of executable file binaries of the target, running applications; and
   generating metadata that includes at least the runtime local execution context;

a collaboration service configured to:
   provide introspected security context for the target, running applications on the instrumented target platform; and
   analyze executable file binaries for the target application running on the instrumented target platform; and a graphical user interface configured to:
   request and receive dynamic assertions from a metadata repository of the attestation service, the dynamic assertions pertaining to the local execution context or the introspected security context of running application instances on the instrumented target platform;
   continuously display the dynamic assertions; and
   provision and dispatch alerts based on the dynamic assertions and predefined criteria.

22. The system according to claim 21, further comprising a network access enforcer configured to:
   subscribe to and receive dynamic application statements including contextual assertions from an attestation service;
   analyze the contextual assertions; and
   determine whether or not an authenticated user is permitted to access an attested application instance via a network.

23. The system according to claim 21, wherein the graphical user interface is further configured to:
   display the applications running on the instrumented target platform in a client specific dashboard or portal, and
   present, for each associated application execution context, at least one of:
      a service hostname;
      a service realm;
      a service principal name;
      a product version;
      a product vendor;
      one or more classification-based confidence metrics;
      an active network service port; or
      executable file binaries.

24. The system according to claim 21, further comprising an identity provider configured to:
   query for dynamic application statements from the attestation server including contextual assertions;
   analyze the contextual assertions; and
   determine whether or not an authenticated user is authorized to exchange data with an attested application instance via an established connection.

25. The system according to claim 21, further comprising a network access enforcer configured to:
   analyze classifications based confidence metrics included in received dynamic application statements, based on a subscription, from an attestation service; and
   determine whether or not an authenticated user is permitted to access an attested application instance via a network.

26. The system according to claim 21, further comprising an identity provider configured to:
   analyze classification-based confidence metrics included in received dynamic application statements, based on a subscription, from an attestation service; and
   determine whether or not an authenticated user is authorized to exchange data with an attested application instance via an established connection.

* * * * *